(12) United States Patent  (10) Patent No.: US 6,321,873 B1
LaBrash  (45) Date of Patent: Nov. 27, 2001

(54) LADDER MOUNTING SYSTEM

(75) Inventor: Richard LaBrash, Salem, MO (US)

(73) Assignee: Tra-Lor-Mate, Inc., Salem, MO (US)

( * ) Notice: Subject to any disclaimer, the term of this patent is extended or adjusted under 35 U.S.C. 154(b) by 0 days.

(21) Appl. No.: 09/553,679

(22) Filed: Apr. 21, 2000

(51) Int. Cl.[7] .................................................... E06C 5/00
(52) U.S. Cl. ................. 182/127; 182/95; 182/97
(58) Field of Search ................. 182/90, 92, 95, 182/97, 127, 163; 280/163, 166; 296/62; 292/218, DIG. 32

(56) References Cited

U.S. PATENT DOCUMENTS

| 934,933 | 9/1909 | Posson . | |
|---|---|---|---|
| 2,700,527 | * 1/1955 | Troche | 182/127 |
| 3,557,906 | 1/1971 | Gutner . | |
| 3,622,189 | 11/1971 | Rosehitz et al. . | |
| 4,018,301 | 4/1977 | Nameche . | |
| 4,134,281 | 1/1979 | Pelcin . | |
| 4,199,041 | 4/1980 | Gutner . | |
| 4,262,834 | * 4/1981 | Nutt | 182/127 |
| 4,482,029 | 11/1984 | Prochaska . | |
| 4,492,286 | 1/1985 | Lemire . | |
| 4,757,876 | 7/1988 | Peacock . | |
| 4,844,523 | 7/1989 | Pastva . | |
| 5,024,292 | 6/1991 | Gilbreath et al. . | |
| 5,145,222 | * 9/1992 | Meyer | 292/258 |
| 5,154,258 | * 10/1992 | Krukow | 182/127 |
| 5,172,952 | 12/1992 | Lasnetski . | |
| 5,624,127 | 4/1997 | Arreola et al. . | |
| 5,687,813 | 11/1997 | Bensch . | |
| 5,735,146 | 4/1998 | Taplin . | |
| 5,820,193 | 10/1998 | Straffon . | |
| 5,853,156 | * 12/1998 | Moore et al. | 248/210 |
| 5,934,116 | * 8/1999 | Moore | 70/212 |
| 5,941,342 | * 8/1999 | Lee | 182/95 |
| 5,964,317 | 10/1999 | Lattavo . | |
| 5,996,736 | * 12/1999 | Stankiewicz | 182/127 |
| 6,082,751 | * 7/2000 | Hanes et al. | 280/163 |
| 6,105,720 | * 8/2000 | Kumher et al. | 182/127 |

* cited by examiner

Primary Examiner—Bruce A. Lev
(74) Attorney, Agent, or Firm—Howell & Haferkamp LC

(57) ABSTRACT

A ladder mounting mechanism is configured for mounting a ladder to a truck trailer. The truck trailer has at least one keeper member fixedly connected thereto. The ladder mounting mechanism includes a frame and at least one moveable locking member moveably connected to the frame. The frame is adapted to be fixedly connected to the ladder. The moveable locking member is adapted for movement relative to the frame between a ladder-secured position and a ladder-unsecured position. In the ladder-secured position, the locking member engages the keeper member in a manner for securing the ladder to the truck trailer. In the ladder-unsecured position, the locking member is disengaged from the keeper member.

19 Claims, 14 Drawing Sheets

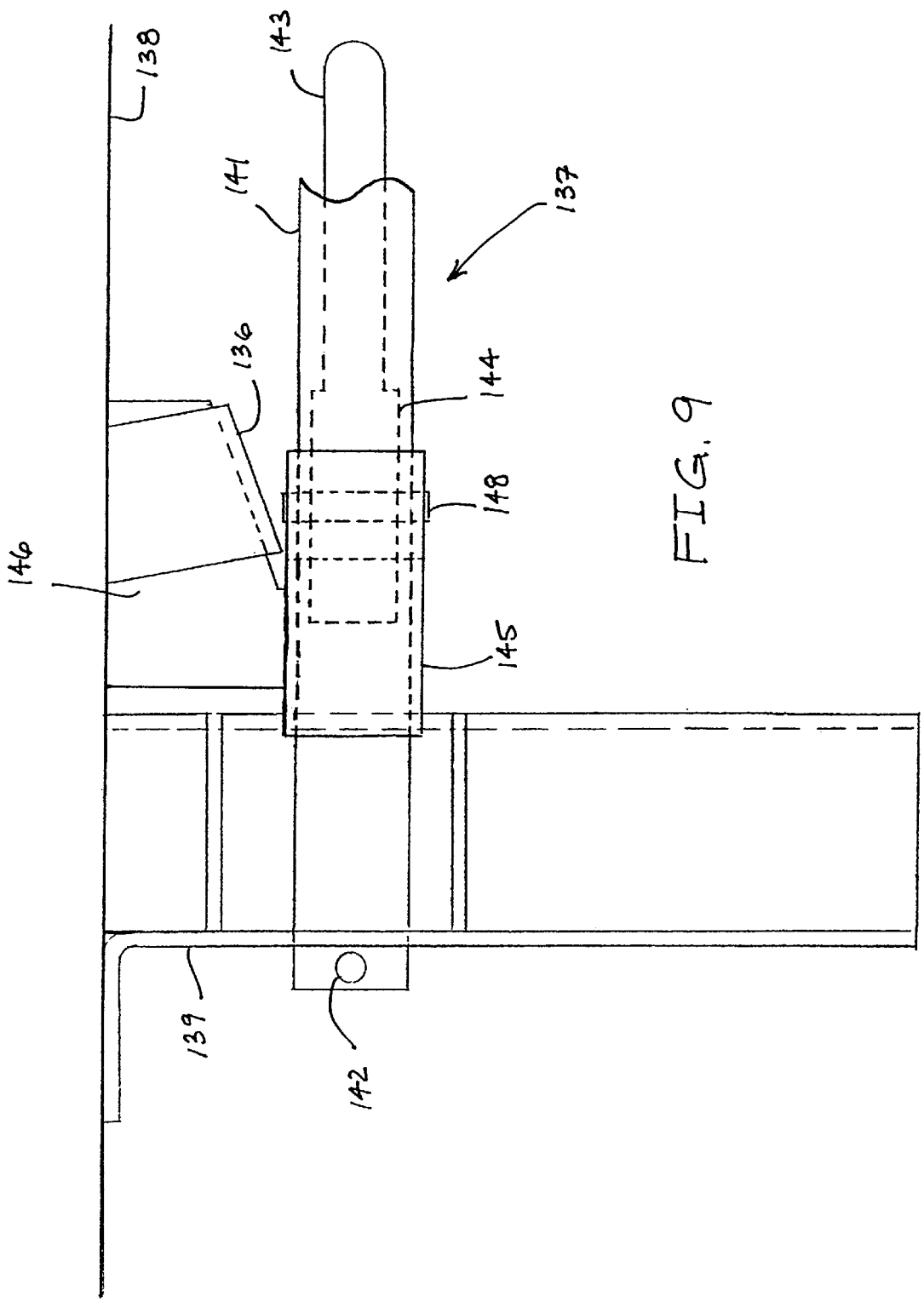

LADDER MOUNTING SYSTEM

BACKGROUND

(1) Field of the Invention

The present invention relates generally to ladders. More particularly, the present invention relates to ladders having mounting mechanisms configured for mounting the ladders to truck trailers for facilitating ingress to and egress from the interior of the truck trailers. Specifically, the present invention relates to a ladder mounting system having at least one moveable locking member that is adapted for locking engagement with the conventional door latching hardware, which is already present on conventional truck trailers for latching the doors thereof.

(2) Background of the Invention

In general, conventional truck trailers have an elongated, substantially horizontal cargo bed that is elevated four or five feet off of the ground. Commercial truck drivers often find it necessary to enter the elevated cargo bed of the truck trailers to load or unload cargo, to perform an inventory check, or to check the condition of the cargo or the trailer. This presents a significant risk of injury to the truck driver or other person attempting to enter or exit the cargo bed because it is necessary for the drivers to lift themselves up four or five feet to the elevated cargo bed by hand and to descend by jumping to the ground.

To reduce the risk of injury, a variety of devices have been developed to facilitate safe ingress to and egress from the elevated cargo bed of a truck trailer. While these devices, if used properly, provide a comparatively safer means of entering and exiting elevated cargo beds, they do have their limitations.

A problem with many prior art truck ladders is that they are difficult and time consuming to install and remove. Many are heavy and cumbersome, making them difficult to handle by one person. Some prior art ladders require mechanical fasteners and tools for mounting the ladders to the trailers. If such devices require more than a few seconds or require any type of tools for installation, the truck drivers may elect not to install the ladders and instead simply climb up by hand, thereby subjecting themselves to the risk of injury discussed above. Therefore, to encourage use of these devices, the devices should be relatively lightweight, so that they can be easily handled by one person, and they should be mountable to the truck trailers in only a few seconds, without the need for tools or any complex manipulations.

Other prior art truck ladders have been developed which are easier and less time consuming to install. For example, ladders have been developed having hooks with a generally inverted-U shape configured to fit over a portion of the horizontal sill extending along the lower edge of the doorway of the trailer. Thus, such ladders can simply be suspended from the sill with the ladder extending generally vertically over the ground. While such ladders are relatively easy to mount, they are unstable and tend to swing inwardly toward the front of the trailer when in use. Also, vertically disposed ladders are difficult to use when exiting the vehicle. Consequently, drivers using such ladders are subjected to many of the same risks of injury discussed above.

Thus, there is a need for a ladder mounting system for quickly mounting a relatively lightweight ladder to a truck trailer, without the need for tools or any complex manipulations, in a manner so that the ladder is secure and safely stable.

Conventional truck trailers have at least one door for closing the cargo storage area. Large semi-truck trailers typically have a pair of large rectangular doors that pivot between open and closed positions about vertical hinges. Such doors are commonly fitted with door latching hardware referred to as cam lock rods. U.S. Pat. No. 4,844,523 to Pastva (issued Jul. 4, 1989) discloses door-latching hardware of the general type that is in common use today. Door latching hardware of the type shown in Pastva is easy to operate and can be used by a single operator to tightly latch the doors at both the top and bottom with little effort. FIG. 1 shows a conventional truck trailer having a cam lock latching mechanism of the type disclosed in Pastva. As shown in FIG. 1, each cam lock device typically consists of a long rod attached to the outside of a vertically-hinged door at several points with pillow block type bearings, which allow the rod to rotate and move axially relative to the door. The ends of the rod extend beyond the upper and lower edges of the door, and each end includes a hooked locking member sometimes referred to as a "cam lock." Keeper members for receiving the cam locks are securely attached to the lower sill and upper doorframe of the trailer. The keeper members are positioned so that the cam locks can be easily inserted into the keeper members as the door is swung toward its closed position about its vertical hinges. The rod includes a handle for rotating the rod relative the door for bringing the cam locks into locking engagement with the keeper members to latch the door in its closed position. A beneficial feature of the cam lock rod hardware is that, at the point where a hinged door is nearly closed, the combined mechanical advantage of the handle, functioning as a lever, and the cam locks at the ends of the rod, make it relatively easy to securely close the door, despite any misalignment of the door or other frictional resistance. The door is unlatched by simply rotating the handle in the opposite direction to disengage the cam locks from the keeper members.

Other conventional truck trailers have slidable closures, such as overhead "roll-down" doors. Such doors are adapted for single hand operation in opening and closing and include a latching hardware that can also be operated with one hand. U.S. Pat. No. 3,622,189 to Rosehitz et al. (issued Nov. 23, 1971) discloses the latching hardware that is commonly used with such overhead doors, and which is still in common use today. The latching hardware comprises a hand lever pivotally mounted to the door and a keeper member, more particularly a "keeper post," recessed in the sill of the truck floor. Connected to the hand lever is a hook arm, which is biased by a resilient compression spring into engagement with the keeper post for latching the door in its closed position. The door is unlatched by simply rotating the handle in the opposite direction to disengage the hook from the keeper post.

The keeper members used with cam lock rods of the type disclosed in Pastva and the keeper posts of the type disclosed in Rosehitz are, by necessity, securely attached to the sill or door frame of the truck trailer. With the pressing need for safe truck ladders that can be securely mounted without complicated mounting hardware, these existing keeper members provide an excellent opportunity for use not only in latching the trailer doors, but also as components of a novel ladder mounting system.

SUMMARY OF THE INVENTION

A general object of the present invention is to provide a ladder mounting system that facilitates safe ingress to and egress from the elevated cargo bed of a truck trailer. Another object of the present invention is to provide a combination ladder and mounting mechanism that is relatively lightweight, so that they it can be easily handled by one person. Still another object of the present invention is to provide a combination ladder and mounting mechanism that is mountable to a truck trailers in only a few seconds, without the need for tools or any complex manipulations. Yet another object of the present invention is to provide a ladder mounting system for mounting a ladder to a truck trailer in a manner so that the ladder is secure and stable. A more specific object of the present invention is to provide a ladder mounting system having at least one moveable locking member that is adapted for locking engagement with the conventional door latching hardware, which is already present on conventional truck trailers for latching the doors thereof.

In general, a ladder mounting mechanism of the present invention is configured for mounting a ladder to a truck trailer. The truck trailer has at least one keeper member fixedly connected thereto. The ladder mounting mechanism includes a frame and at least one moveable locking member moveably connected to the frame. The frame is adapted to be fixedly connected to the ladder. The moveable locking member is adapted for movement relative to the frame between a ladder-secured position and a ladder-unsecured position. In the ladder-secured position, the locking member engages the keeper member in a manner for securing the ladder to the truck trailer. In the ladder-unsecured position, the locking member is disengaged from the keeper member.

In another aspect of the present invention, a ladder is adapted to be mounted to a truck trailer having first and second keeper members fixedly connected thereto. The first and second keeper members are spaced from one another on the truck trailer. The ladder includes a pair of elongate side rails extending in parallel spaced relation to one another. The side rails are connected to one another by a plurality of transverse rungs. The ladder also includes a frame and first and second moveable locking members. The frame is fixedly connected to an upper portion of the ladder. The first and second moveable locking members are each moveably connected to the frame and adapted for rotating movement relative to the frame. Each of the first and second locking members is moveable relative to the frame between a ladder-secured position and a ladder-unsecured position. In its ladder-secured position, the first locking member engages the first keeper member in a manner for securing the ladder to truck trailer. In its ladder-unsecured position, the first locking member is disengaged from the first keeper member. Similarly, when the second locking member is in its ladder-secured position, it engages the second keeper member in a manner for securing the ladder to the truck trailer and, when the second locking member is in its ladder-unsecured position, it is disengaged from the second keeper member.

While the principal advantages and features of the present invention have been described above, a more complete and thorough understanding and appreciation for the invention may be attained by referring to the drawings and description of the preferred embodiments, which follow.

BRIEF DESCRIPTION OF THE DRAWINGS

FIG. 9 is a fragmented top plan view of the ladder mounting system of FIG. 8 shown in the locked position;

Figure 1:
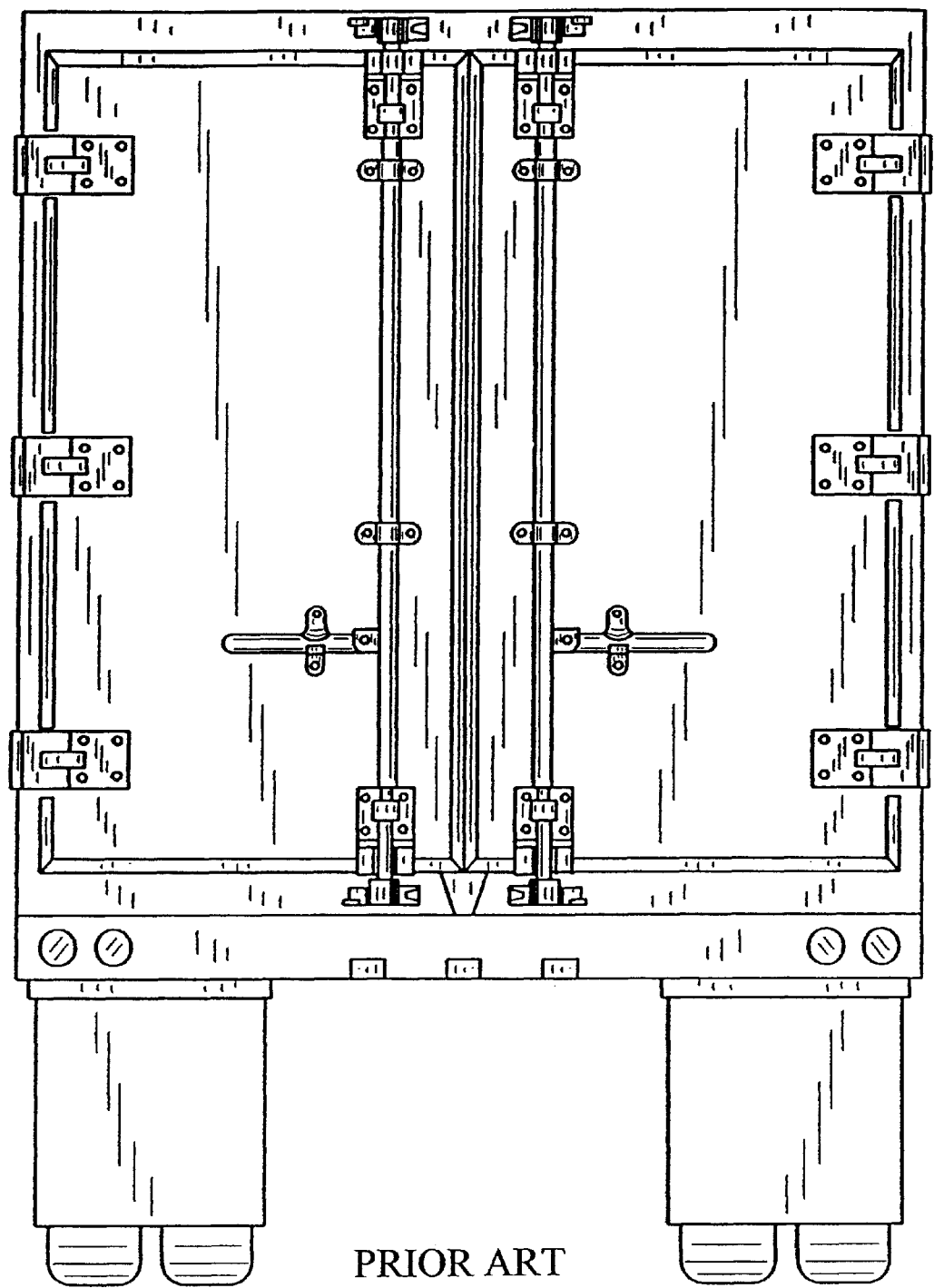
FIG. 1 is an elevational view of a conventional truck trailer having a pair of vertically hinged doors, each of said doors being shown in a closed position and latched by a conventional cam rod type latch mechanism.

Reference numerals in these figures correspond to reference numerals in the following detailed description.

DETAILED DESCRIPTION OF THE PREFERRED EMBODIMENTS

Figure 2:
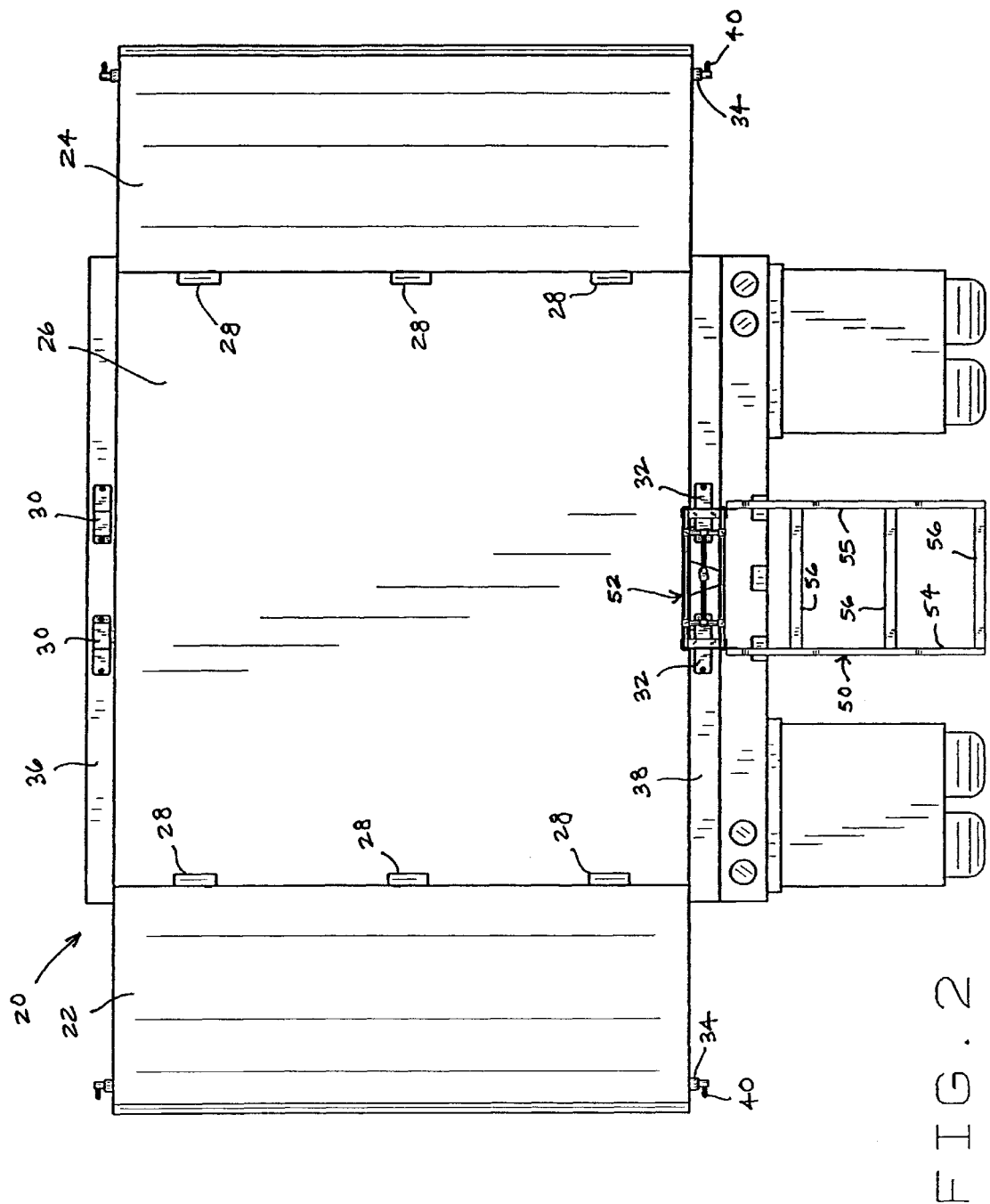
FIG. 2 is an elevational view of a ladder and ladder mounting system of the present invention mounted to the rear of a truck trailer with the vertically hinged doors of the truck trailer in an open position.

FIG. 2 is an elevational view of a truck trailer, represented generally by the reference numeral 20, similar to the conventional truck trailer shown in FIG. 1. The truck trailer 20 has a pair of vertically hinged doors 22 and 24 that are adapted to enclose a generally rectangular cargo storage area 26. The doors 22 and 24 are pivotally attached to sidewalls of the trailer by a plurality of hinges 28 for pivoting movement between open positions (shown in FIG. 2) and closed positions (see the trailer of FIG. 1). The trailer 20 includes a pair of upper keeper members 30 and a pair of lower keeper members 32, which are used in connection with conventional cam lock rods 34 for latching the doors 22 and 24 in their closed positions. The upper keeper members 30 are securely attached to an upper doorframe 36 of the trailer 20 with mechanical fasteners or the like. The lower keeper members 32 are securely attached to a lower sill 38 of the trailer 20, also with mechanical fasteners or the like. The keeper members 30 and 32 are positioned on the upper doorframe 36 and lower sill 38, respectively, so that hooked end portions 40 of the cam lock rods 34 can be brought into locking engagement with the keeper members 30 and 32 when the doors 22 and 24 are pivoted to their closed positions.

When the doors 22 and 24 are in their open positions, as shown in FIG. 2, the upper and lower keeper members 30 and 32 are not in use as door latches. Thus, as hereinafter explained, the lower keeper members 32 are free for use as components of the ladder mounting system of the present invention. The structure and function of the lower keeper members 32 will be described in more detail below.

With continued reference to FIG. 2, a ladder of the present invention, represented generally by the reference numeral 50, is mounted to the lower sill 38 of the trailer 20 by a mounting mechanism of the present invention, which is represented generally by the reference numeral 52. Apart from the novel mounting mechanism 52, the ladder itself is, for the most part, conventional in that it comprises a pair of elongate side rails 54 and 55 extending in parallel spaced relation to one another, and a plurality of transverse steps or rungs 56 extending between and connecting the rails 54 and 55 to one another. As hereinafter explained, the mounting mechanism 52 includes components that are adapted for locking engagement with the lower keeper members 32 for securely mounting the ladder 50 to the lower sill 38 of the trailer 20.

Figure 3:
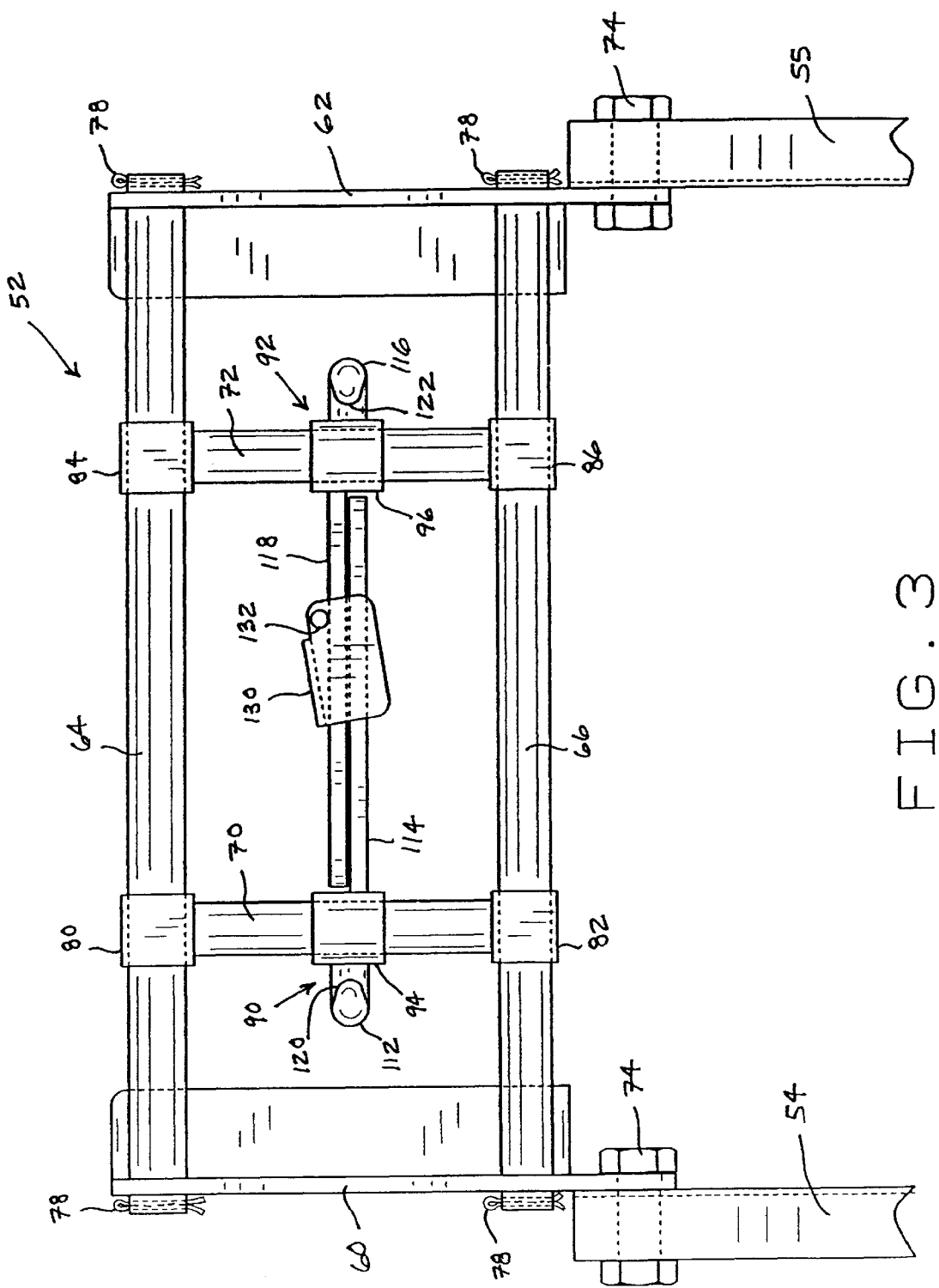
FIG. 3 is an enlarged, fragmented front elevational view of the ladder and ladder mounting system of FIG. 2 with locking members of the ladder mounting system shown in locked positions.
Figures 4, 5:
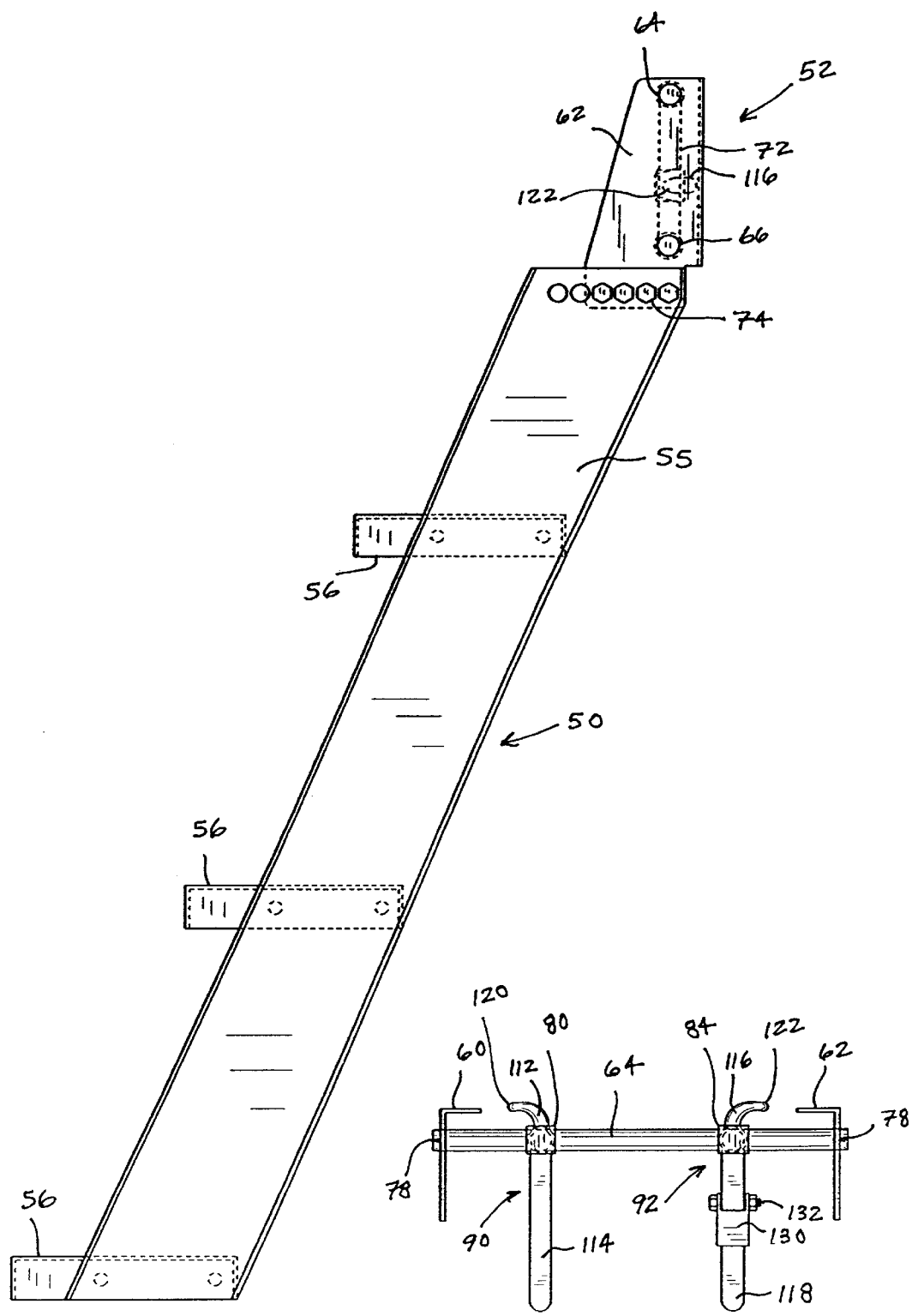
FIG. 4 is a right side elevational view of the ladder and ladder mounting system of FIG. 2 with the locking members of the ladder mounting system shown in locked positions.
FIG. 5 is a top plan view of the ladder mounting system of FIGS. 2 and 3 with the locking members shown in unlocked positions.

Referring now to FIGS. 3 through 5, the mounting mechanism 52 includes a frame having a left flange 60, a right flange 62, first and second elongate support members 64 and 66 extending longitudinally between the left and right flanges 60 and 62, and first and second cross members 70 and 72 extending transversely between the first and second elongate support members 64 and 66. As shown in FIG. 3, the left and right flanges 60 and 62 are connected to upper portions of the side rails 54 and 55 of the ladder. Preferably, the flanges 60 and 62 are connected to the side rails 54 and 55 with mechanical fasteners 74, although they could be welded or otherwise connected without departing from the scope of the present invention.

The first and second elongate support members 64 and 66 extend longitudinally in parallel spaced relation to one another. The ends of the first and second elongate support members 64 and 66 extend through apertures in the left and right flanges 60 and 62 and just beyond the flanges. The ends of the first and second elongate support members 64 and 66 include small transverse bores for receiving cotter pins 78 or other mechanical fasteners for fixing the first and second elongate support members 64 and 66 relative to the left and right flanges 60 and 62.

The first cross member 70 has an upper sleeve member 80 at its upper end that at least partially surrounds a portion of the first support member 64. The first cross member 70 also has a lower sleeve member 82 at its lower end that at least partially surrounds a portion of the second support member 66. The upper and lower sleeve members 80 and 82 of the first cross member 70 are slidable longitudinally along the first and second support members 64 and 66, respectively. Similarly, the second cross member 72 has an upper sleeve member 84 at its upper end that at least partially surrounds a portion of the first support member 64 and a lower sleeve member 86 at its lower end that at least partially surrounds a portion of the second support member 66. The upper and lower sleeve members 84 and 86 of the second cross member 72 are slidable longitudinally along the first and second support members 64 and 66, respectively. Preferably, the first and second cross members 70 and 72 are slidable along the first and second support members 64 and 66 independently of one another.

In the preferred embodiment, each of the first and second elongate support members 64 and 66 has a generally cylindrical configuration. The upper and lower sleeve members 80, 82, 84 and 86 of the first and second cross members 70 and 72 have a generally cylindrical configuration and are constructed from commonly available metal tubing. However, these components could have other mating configurations that permit at least one-dimensional sliding movement relative to one another without departing from the scope of the present invention.

Also, although this embodiment of the invention has been described as having two elongate support members 64 and 66, the mounting mechanism 52 could be constructed with a single elongate supporting member 64 or 66 without departing from the scope of the invention. In an embodiment having only one elongate supporting member, the cross members 70 and 72 would obviously not be connected at both ends to supporting members. Thus, in an embodiment having only one elongate supporting member, the cross sections of the elongate support member and the mating sleeve members of the cross members are preferably square or otherwise configured to prevent rotation of the cross members relative to the single elongate support member to which they are connected.

Referring again to FIGS. 3 through 5, the mounting mechanism 52 further comprises a first moveable locking member 90 and a second moveable locking member 92. The first moveable locking member 90 is moveably connected to a portion of the first cross member 70 intermediate the upper and lower sleeves 80 and 82 thereof. Similarly, second moveable locking member 92 is moveably connected to a portion of the second cross member 72 intermediate the upper and lower sleeves 84 and 86 thereof.

The first moveable locking member 90 includes a first tubular sleeve portion 94 that at least partially surrounds the portion of the first cross member 70 to which it is connected. The tubular sleeve portion 94 of the first moveable locking member 70 is slidable transversely along the first cross member 70 between the upper and lower sleeve members 80 and 82 thereof. Similarly, the second moveable locking member 92 includes a second tubular sleeve portion 96 that at least partially surrounds the portion of the second cross member 72 to which it is connected. The second tubular sleeve portion 96 of the second moveable locking member 72 is slidable transversely along the second cross member 72 between the upper and lower sleeve members 84 and 86 thereof. Preferably, the first and second cross members 70 and 72 have a cylindrical configuration and the first and second tubular sleeve portions 94 and 96 of the first and second moveable locking members 90 and 92 also have a cylindrical configuration. Thus, the first and second moveable locking members 90 and 92 are not only slidable transversely along the first and second cross members 70 and 72, but they are also rotatable about the first and second cross members 70 and 72. Accordingly, each of the first and second moveable locking members 90 and 92 has three degrees of freedom relative to the ladder. The structure and function of the first and second moveable locking members 90 and 92 will be described in further detail hereinafter, and the importance of the three degrees of freedom of the first and second moveable locking members 90 and 92 will then become apparent.

Figure 6:
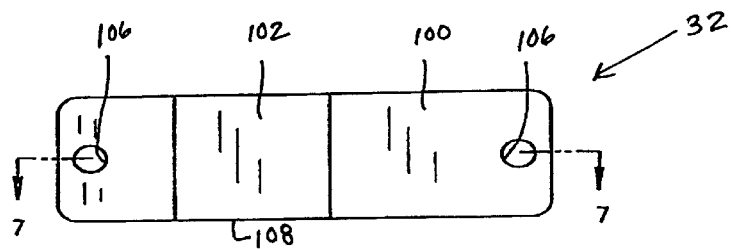
FIG. 6 is a front elevational view of a keeper member used in the present invention.
Figure 7:
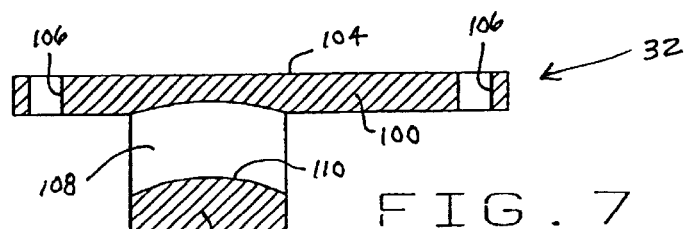
FIG. 7 is a sectional view of the keeper member of FIG. 6 taken along the plane of line 7—7 in FIG. 6.

The lower keeper members 32 are conventional, and an important benefit of the present invention is that existing conventional keeper members (heretofore intended only for use in latching the trailer's doors) can be used for mounting the ladder 50 of the present invention to the lower sill 38 of the trailer 20. As shown in FIGS. 6 and 7, each of the lower keeper members 32 comprises a mounting plate 100 and a catch 102 connected to the mounting plate 100. The mounting plate 100 has a substantially flat mounting surface 104 adapted to fit flush against the lower sill 38 of the trailer 20. The mounting plate 100 preferably includes bores 106 for mechanically fastening the keeper members 32 to the lower sill 38. As shown in FIG. 7, the catch 102 is preferably spaced from the mounting plate 100 by a lower linking portion 108 (shown in FIG. 7) and an upper linking portion (not shown) to define a recess 110 therebetween.

Referring again to FIGS. 3 and 5, the first moveable locking member 90 includes a first latch portion 112 and a first hand-engaging portion 114. Similarly, the second moveable locking member 92 includes a second latch portion 116 and a second hand-engaging portion 118. The first and second moveable locking members 90 and 92 are adapted for rotating movement about the first and second cross members 70 and 72, respectively, between ladder-secured positions (shown in FIGS. 2 through 4) and ladder-unsecured positions (shown in FIG. 5).

When the first moveable locking member 90 is in its ladder secured position, the first latch portion 112 engages one of the keeper members 32 in a manner for securing the ladder 50 to the lower sill 38 of the trailer 20. Similarly, when the second moveable locking member 92 is in its ladder secured position, the second latch portion 116 engages the other keeper member 32 in a manner for securing the ladder 50 to the lower sill 38 of the trailer 20. When the first and second moveable locking members 90 and 92 are in their ladder-unsecured positions, the first and second latch portions 112 and 116 are disengaged from the keeper members 32 so the ladder 50 can be removed from the trailer 20. While the present embodiment has been described as having two moveable locking members working together to mount the ladder to the trailer, it should be understood that a ladder could also be mounted with only one moveable locking member and one keeper member, without departing from the scope of the present invention.

As shown in FIGS. 3 and 5, the first latch portion 112 and the first hand-engaging portion 114 are operatively connected to one another so that movement of the first hand engaging portion 114 causes movement of the first latch portion 112. Preferably, the first latch portion 112, first sleeve portion 94 and first hand-engaging portion 114 are integral with one another. These components are preferably welded to one other, but may also be mechanically fastened to one another or molded as single piece. Similarly, the second latch portion 116 and the second hand-engaging portion 118 are operatively connected to one another so that movement of the second hand engaging portion 118 causes movement of the second latch portion 116. The second latch portion 116, second sleeve portion 96 and second hand-engaging portion 118 are also preferably integral with one another. Preferably, these components are welded to one other, but may also be mechanically fastened to one another or molded as single piece.

The first latch portion 112 includes a first projection 120 with a generally hook-shaped configuration. The recess 110 between the catch 102 and the mounting plate 100 of one of the keeper members 32 is adapted to receive the first projection 120 when the first moveable locking member 90 is rotated toward its ladder-secured position. The hook-shaped first projection 120 is adapted for engagement with the catch portion 102 of the keeper member 32 when the first moveable locking member 90 is in its ladder-secured position. Similarly, the second latch portion 116 includes a second projection 122 having with a generally hook-shaped configuration. The recess 110 between the catch 102 and the mounting plate 100 of the other keeper member 32 is adapted to receive the second projection 122 when the second moveable locking member 92 is rotated toward its ladder-secured position, and the hook-shaped second projection 122 is adapted for engagement with the catch portion 102 of the keeper member 32 when the second moveable locking member 92 is in its ladder-secured position.

In the preferred embodiment of the present invention shown in FIG. 5, the hook-shaped first projection 120 extends in a generally counterclockwise direction from the first sleeve portion 94 of the first moveable locking member 90, and the hook-shaped second projection 122 extends in a generally clockwise direction from the second sleeve portion 96 of the second moveable locking member 92.

Thus, to install the ladder 50 of the present invention, the ladder is positioned against the lower sill 38 of the trailer 20 adjacent the lower keeper members 32, with the lower keeper members 32 positioned between the first and second elongate support members 64 and 66. Then, using the first and second hand-engaging portions 114 and 118, the first and second cross members 70 and 72 are moved along the first and second elongate support members 64 and 66 to position the first and second latch portions 112 and 116 of the first and second locking members 90 and 92 adjacent the recesses 110 of the lower keeper member 32. Then, the first hand-engaging portion 114 is rotated in a counterclockwise direction relative to the first cross member 70 so that the hook-shaped first projection 120 is inserted into the recess 110 of the left keeper member 32, and the second hand-engaging portion 118 is rotated in a clockwise direction relative to the second cross member 72 so that the hook-shaped second projection 122 is inserted into the recess 110 of the right keeper member 32. Rotation of the first and second hand-engaging portions 114 and 118 continues until the hook-shaped first and second projections 120 and 122 are in locking engagement with the catch portions 102 of the keeper members 32. The adjustability of these components allows the mounting mechanism 52 to be used in connection with various conventional keeper members having different spacings relative to one another. To remove the ladder 50 from the trailer 20, the first hand-engaging portion 114 is simply rotated in a clockwise direction and the second hand-engaging portion 118 is simply rotated in a counter-clockwise direction until the hook-shaped first and second projections 120 and 122 are fully disengaged from the catch portions 102 of the keeper members 32.

As shown in FIG. 3, the first hand engaging portion 114 and the first projection 120 are preferably aligned relative to one another so that the first hand engaging portion 114 is generally parallel with the first and second elongate support members 64 and 66 when the first moveable locking member 90 is in its ladder secured position. Similarly, the second hand engaging portion 118 and the second projection 122 are preferably aligned relative to one another so that the second hand engaging portion 118 is generally parallel with the first and second elongate support members 64 and 66 when the second moveable locking member 92 is in its ladder secured position. When the first and second moveable locking members 90 and 92 are both in their respective ladder secured positions, the first and second hand engaging portions 114 and 118 are immediately adjacent one another.

As shown in FIGS. 3 and 5, the second moveable locking member 118 includes a bracing member 130 adapted for locking the first and second moveable locking members 90 and 92 relative to one another when the first and second moveable locking members 90 and 92 are both in their respective ladder secured positions. The bracing member 130 is pivotable about a pivot pin 132, which is fixedly connected to the second hand engaging portion 118 of the second moveable locking member 92. The bracing member 130 has a generally U-shaped cross-sectional configuration, which is sized to fit over the first and second hand-engaging portions 114 and 118 in a manner to fix the relative positions of the first and second moveable locking members 90 and 92 when the first and second moveable locking members 90 and 92 are in their respective ladder secured positions (see FIG. 3). The bracing member 130 is pivoted upwardly away from the first and second hand engaging portions 114 and 118 when the first and second moveable locking members 90 and 92 need to be moved.

Figure 8:
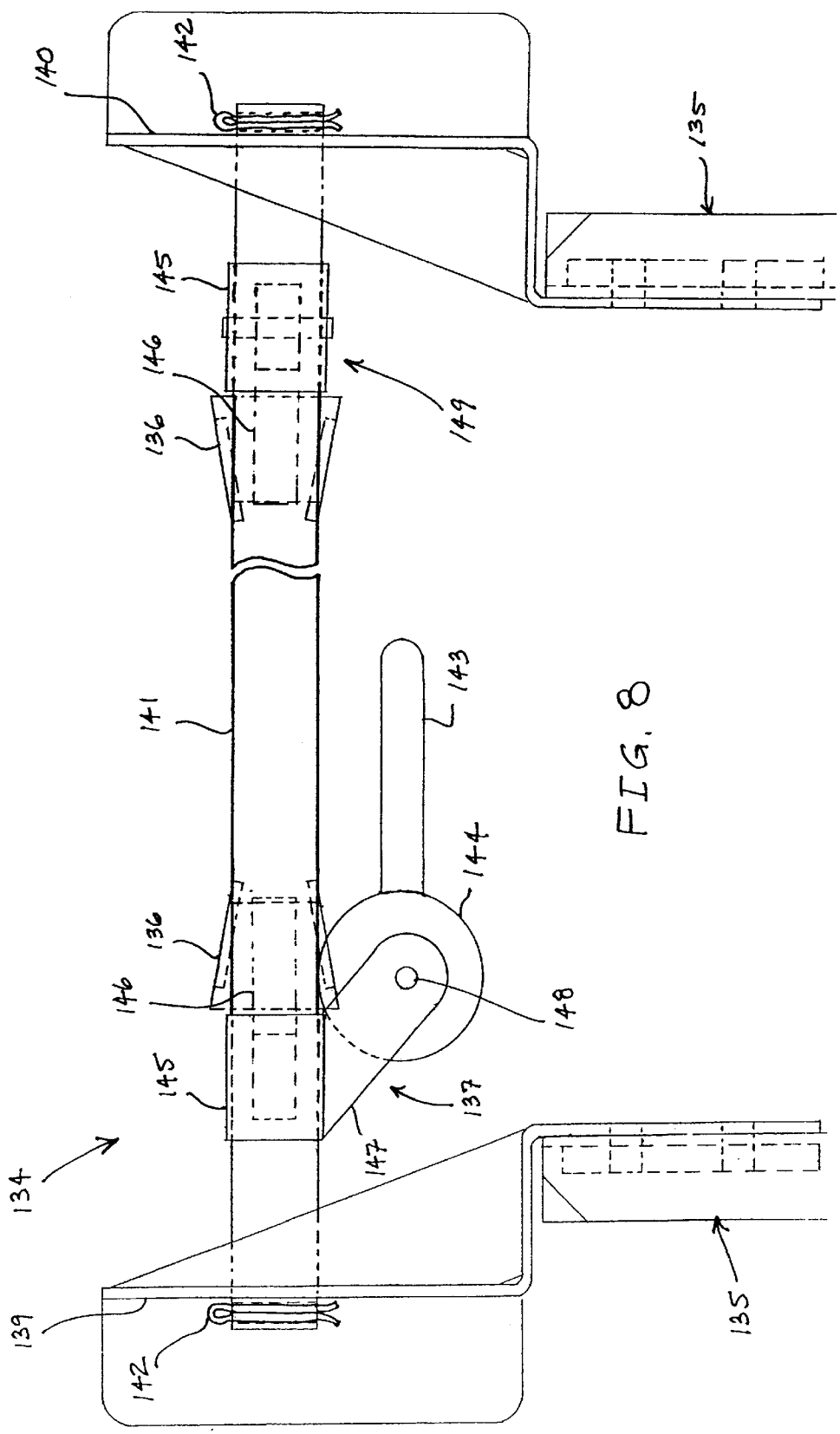
FIG. 8 is a fragmented front elevational view of a second embodiment of a ladder and ladder mounting system of the present invention with a moveable locking member shown in a locked position.

A second embodiment of a ladder mounting mechanism of the present invention is shown in FIGS. 8 and 9, and is represented generally by the reference numeral 134. The mounting mechanism 134 is designed for mounting a ladder 135 to conventional truck trailers having keeper members 136 similar in most respects to the lower keeper members 32 shown in FIGS. 2, 6 and 7. As hereinafter explained, the mounting mechanism 134 includes components that are adapted for locking engagement with the keeper members 136 for securely mounting the ladder 135 to the lower sill 138 of the trailer. The ladder 135 shown partially shown in FIG. 8 is similar in all respects to the ladder 50 of FIGS. 2–5.

As best shown in FIG. 8, the mounting mechanism 134 includes a frame having a left flange 139, a right flange 140, and an elongate support member 141 extending longitudinally between the left and right flanges 139 and 140. The mounting mechanism also includes a moveable locking member, represented generally by the reference numeral 137. The left and right flanges 139 and 140 are connected to upper portions of the side rails of the ladder 135, preferably with mechanical fasteners (not shown), although they could be welded or otherwise connected without departing from the scope of the present invention. The ends of the elongate support member 141 extend through apertures in the left and right flanges 139 and 140 and just beyond the flanges. The ends of the elongate support member 141 include small transverse bores for receiving cotter pins 142 or other mechanical fasteners for fixing the elongate support member 141 relative to the left and right flanges 139 and 140.

In general, the moveable locking member 137 includes a hand engaging portion 143, a cam wheel 144, a sleeve member 145 and a locking portion 146. The sleeve member 145 at least partially surrounds the elongate support member 141 and permits the moveable locking member 137 to slide longitudinally along the length of the elongate support member 141. Preferably, the cross sections of the elongate support member 141 and the mating sleeve member 145 square or otherwise configured to prevent rotation of the moveable locking member 137 relative to the elongate support member 141 to which it is connected.

The sleeve member 145 includes a clevis 147 extending generally radially therefrom. Preferably, the clevis 147 and sleeve member 145 are welded to one another or are formed as a monolithic piece. The clevis 147 has two sides with apertures adapted to receive a pin 148 on which the cam wheel 144 rotates. As shown in FIG. 8, the pin 148 is slightly off-center so that the cam wheel 144 operates as an eccentric cam. The hand-engaging portion 143 is fixedly connected to the cam wheel 144 so that movement of the hand-engaging portion 143 causes movement of the cam wheel 144. Preferably, the hand-engaging portion 143 and cam wheel 144 are welded to one another or are formed as a monolithic piece. The moveable locking member 137 is moveable between a ladder-secured position and a ladder-unsecured position. In the ladder secured position (shown in FIGS. 8 and 9), the hand-engaging portion 143 is rotated upwardly toward the elongate support member 141 so that the thicker portion of the cam wheel 144 cammingly engages against the elongate support member 141. In the ladder-unsecured position (not shown), the hand engaging portion 143 is rotated downwardly (clockwise in FIG. 8) away from the elongate support member 141 so that a portion of the cam wheel 144 with a smaller radius is positioned between the elongate support member 141 and the pin 148.

As best shown in FIG. 9, the locking portion 146 extends generally radially from the sleeve member 145. Preferably, the locking portion 146 and sleeve member 145 are welded to one another or are formed as a monolithic piece. The locking portion 146 includes a projecting distal end, which is adapted for engagement with a recess of the keeper member 136 to secure the ladder 135 the lower sill 138 of the trailer. The projecting distal end of the locking portion 146 is brought into engagement with the recess of the keeper member 136 by moving the moveable locking member 137 along the elongate support member 141 (to the right as viewed in FIGS. 8 and 9). By moving the moveable locking member 137 along the elongate support member 141 in the opposite direction (to the left as viewed in FIGS. 8 and 9), the projecting distal end of the locking portion 146 can be disengaged from the keeper member 136.

As shown in FIG. 8, the mounting mechanism also includes a stationary locking member, represented generally by the reference numeral 149 in FIG. 8. The stationary locking member 149 preferably includes an identical sleeve member 145 and locking portion 146. However, preferably, the sleeve member is not moveable along the elongate support member 141 and, instead is fixed relative thereto by a locking pin or the like. Alternatively, the locking portion 146 could be welded directly to the elongate support member or could be formed monolithically therewith. It is important that the stationary locking member 149 be fixed relative to the elongate support member 141 so that a single operator can easily install the ladder 135, with one hand holding the ladder and the other hand operating the moveable locking member 137.

Thus, install the ladder 135 of the present invention, the ladder is positioned against the lower sill 138 of the trailer adjacent the keeper members 32, with the keeper members 136 positioned between the left and right flanges 139 and 140. Then, the projecting distal end of the locking portion 146 of the stationary locking member is brought into engagement with the recess of the right-hand keeper member 136. Next, using the hand engaging portion 143, the moveable locking member 137 is moved longitudinally along the elongate support member 141 (to the right as viewed in FIGS. 8 and 9) until the projecting distal end of the locking portion 146 of the moveable locking member 137 is brought into engagement with the recess of the left-hand keeper member 136. Finally, the hand engaging portion 143 is rotated upwardly (counterclockwise in FIG. 8) toward the elongate support member 141 until the thicker portion of the cam wheel 144 cammingly engages against the elongate support member 141 in a tight fit that fixes the position of the moveable locking member 137 relative to the elongate support member 141. This is the ladder-secured position of the moveable locking member 137. To remove the ladder 135 from the trailer, the hand engaging portion 143 is rotated downwardly (clockwise in FIG. 8) away from the elongate support member 141 so that a portion of the cam wheel 144 with a smaller radius is positioned between the elongate support member 141 and the pin 148, thereby freeing up the moveable locking member 137 for longitudinal movement along the elongate support member 141. Then, using the hand engaging portion 143, the moveable locking member 137 is moved longitudinally along the elongate support member 141 (to the left as viewed in FIGS. 8 and 9) until the projecting distal end of the locking portion 146 of the moveable locking member 137 is disengaged from the left-hand keeper member 136.

Figure 10:
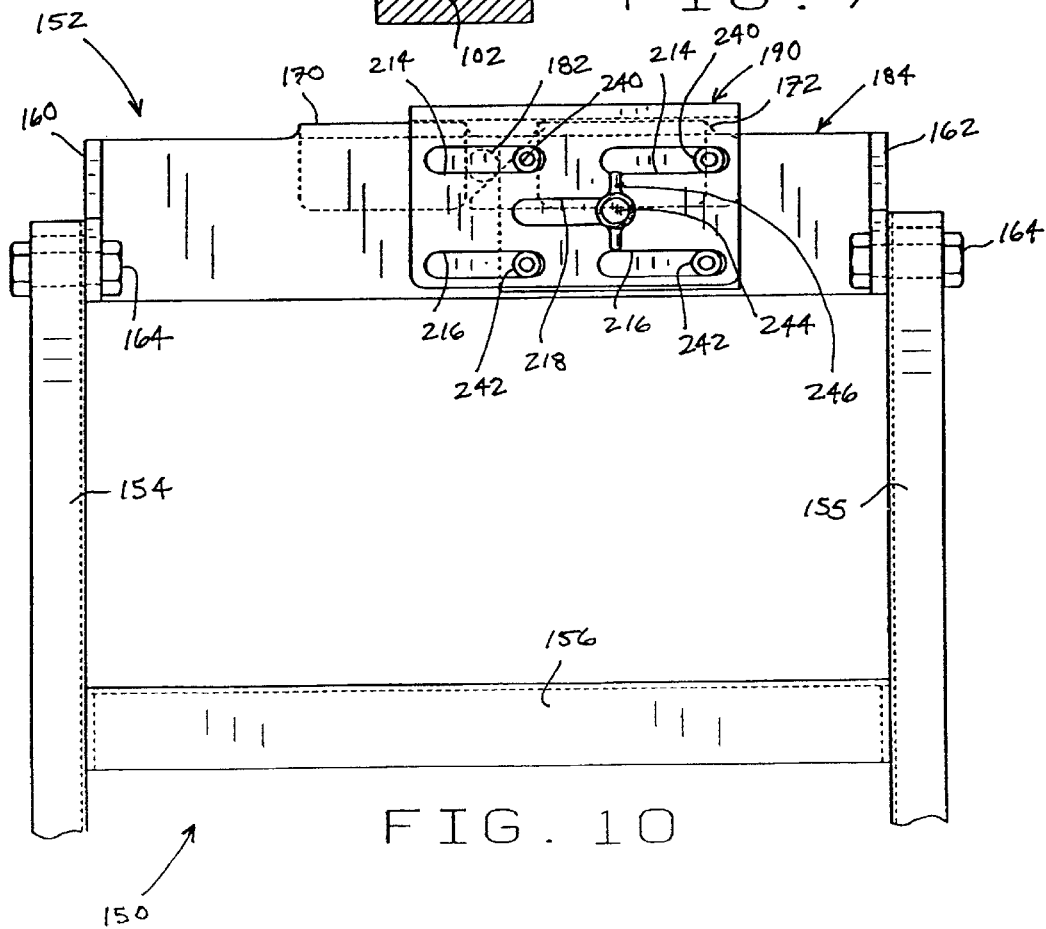
FIG. 10 is a fragmented front elevational view of a third embodiment of a ladder and ladder mounting system of the present invention with a moveable locking member shown in a locked position.
Figure 11:
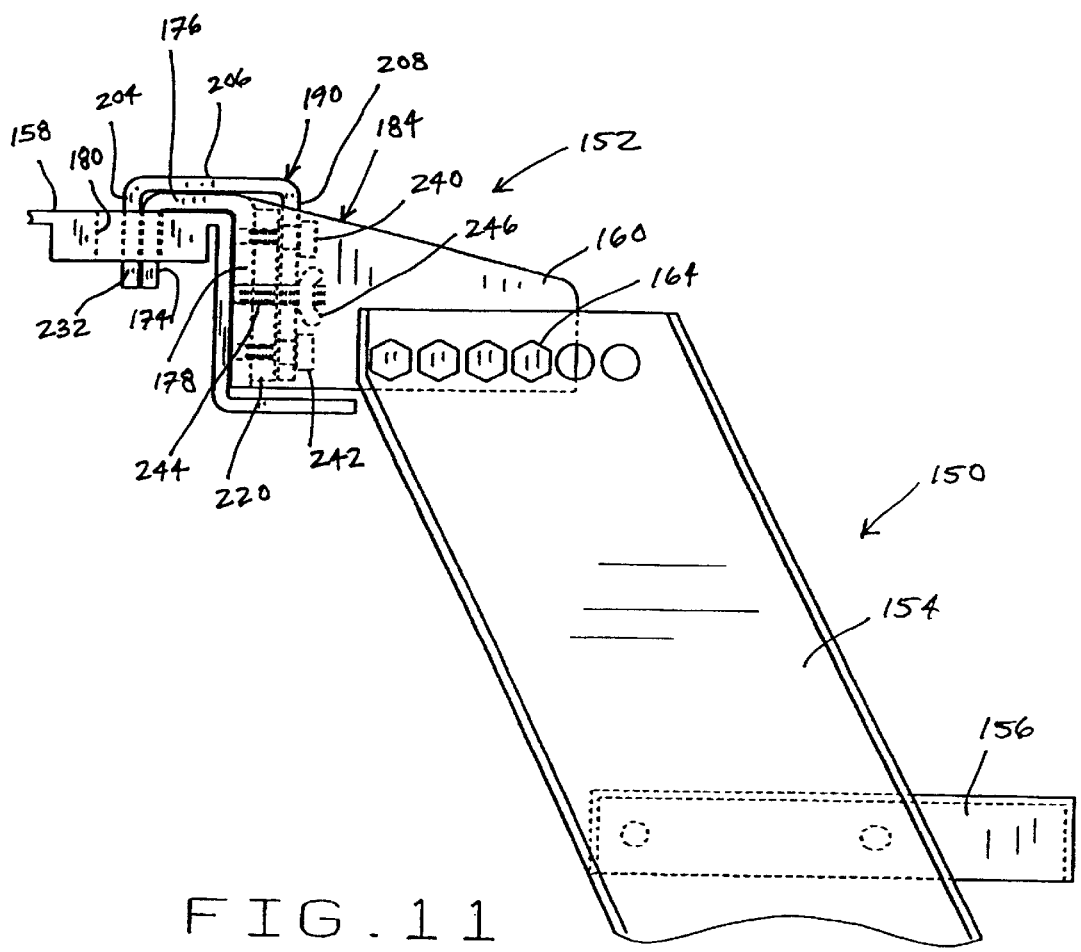
FIG. 11 is a left side elevational view of the ladder and ladder mounting system of FIG. 10 shown in the locked position.
Figure 12:
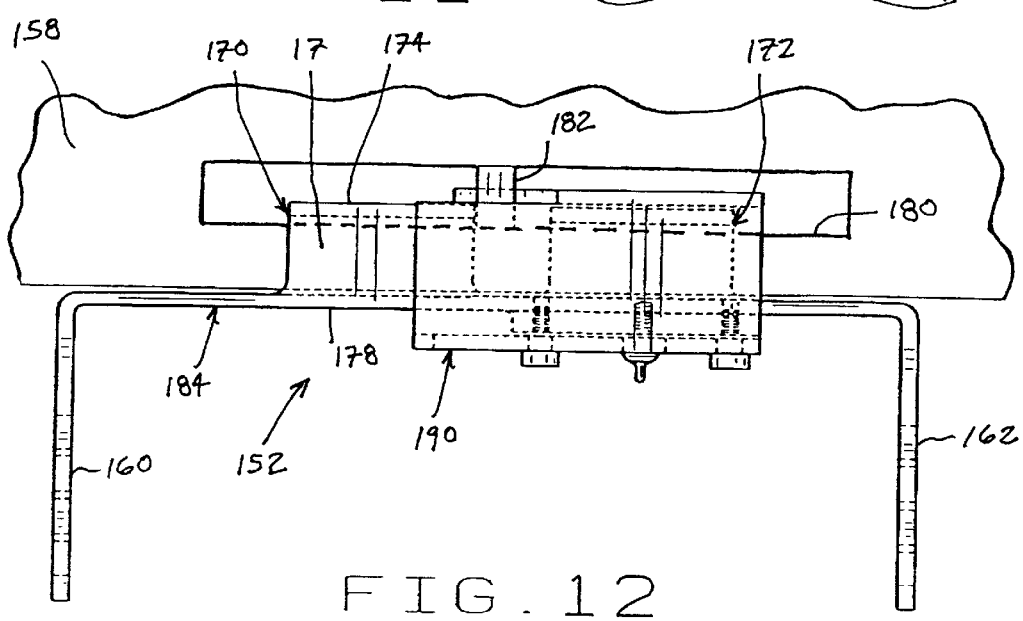
FIG. 12 is a top plan view of the ladder mounting system of FIGS. 10 and 11 shown in the locked position.

A third embodiment of a ladder mounting mechanism of the present invention is shown in FIGS. 10 through 12, and is represented generally by the reference numeral 152. The mounting mechanism 152 is designed for mounting a ladder 150 to conventional truck trailers having overhead "rolldown" doors and associated latching hardware of the type disclosed in the Rosehitz et al. patent discussed above.

The mounting mechanism 152 is adapted for mounting the ladder 150 to a lower sill 158 of the trailer. The ladder 150 shown in FIGS. 10 through 12 is similar in all respects to the ladder 50 of FIGS. 2–5. The ladder 152 comprises a pair of elongate side rails 154 and 155 extending in parallel spaced relation to one another, and a plurality of transverse rungs 156 extending between and connecting the side rails 154 and 155 to one another. As best shown in FIGS. 11 and 12, the lower sill 158 includes a generally rectangular recess 180 extending longitudinally along a portion of the lower sill 158. A keeper post 182 is positioned within the recess 180 below the surface of the lower sill 158. The keeper post 182 is generally cylindrical and is oriented so that it extends across the recess 180.

Figure 13:
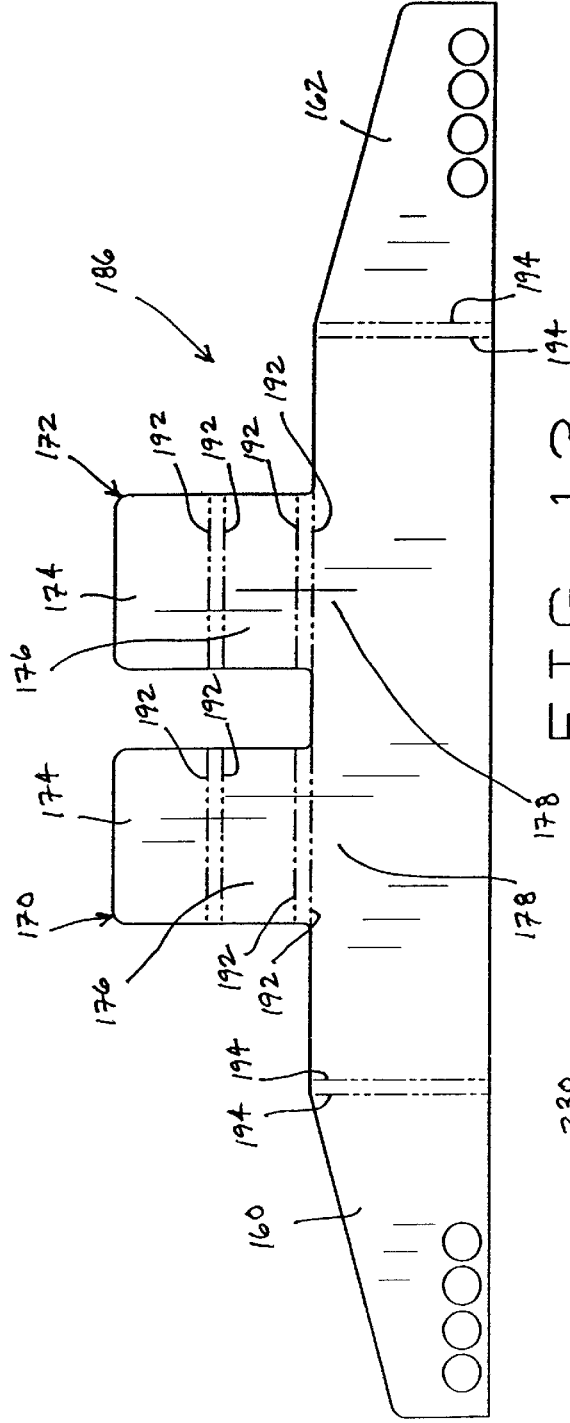
FIG. 13 is a top plan view of a sheet metal blank used to form a frame component of the ladder mounting system of FIGS. 10 through 12.

In general, the mounting mechanism 152 includes a frame member 184 and a moveable locking member 190. The frame member 184 includes left and right flange portions 160 and 162, which are fixedly connected to the left and right side rails 154 and 155 of the ladder 150 by mechanical fasteners 164 or the like. The frame member 184 further comprises a pair of mounting hooks 170 and 172. Each of the mounting hooks has a generally inverted-U shaped configuration defined by a lead panel 174, an upper panel 176 and a rear panel 178. As shown in FIGS. 11 and 12, the mounting hooks 170 and 172 of the frame member 184 are shaped to fit over a portion of the lower sill 158 of the trailer just behind the rectangular recess 180. The lead panels 174 of the mounting hooks 170 and 172 are adapted to project downwardly into the recess 180. The upper panels 176 of the mounting hooks 170 and 172 are adapted to rest on the portion of the lower sill 158 of the trailer just behind the rectangular recess 180. FIG. 13 is a plan view of a sheet metal blank used to form the frame member 186 shown in FIGS. 10 through 12. Bend lines of the sheet metal blank are represented by the reference numerals 192 and 194. To form the frame member 184 shown in FIGS. 10 through 12, the blank 186 is bent along bend lines 192 in one direction to form the left and right flanges 160 and 162 and is bent along bend lines 194 in the opposite direction to form the U-shaped mounting hooks 170 and 172.

Figure 14:
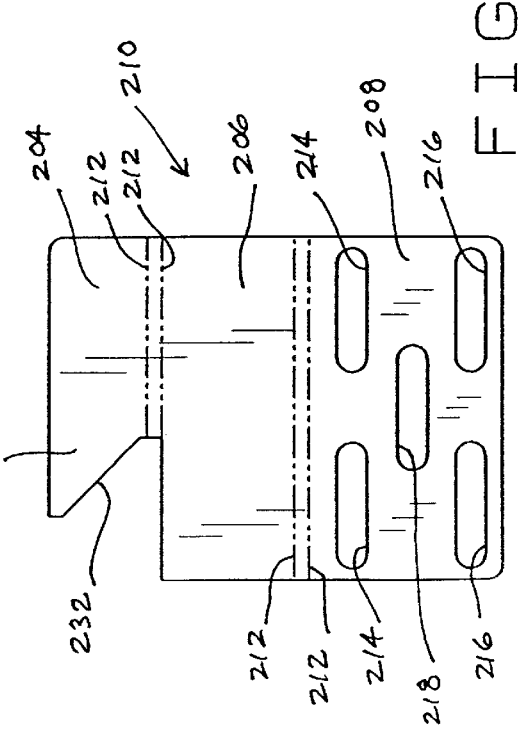
FIG. 14 is a top plan view of a sheet metal blank used to form a moveable locking member of the ladder mounting system of FIGS. 10 through 12.

The moveable locking member 190 also has a generally inverted-U shaped cross-sectional configuration defined by a lead panel 204, an upper panel 206 and a rear panel 208. The moveable locking member 190 is shaped to fit over a portion of the right mounting hook 172 of the frame member 184. The upper panel 206 of the moveable locking member 190 extends over the upper panel 176 of the right mounting hook 172 and is adapted to rest thereon. The lead panel 204 of the moveable locking member 190 extends downwardly from a lead edge of the upper panel 206 along the surface of the lead panel 174 of the right mounting hook 172. As best shown in FIGS. 10 and 11, the lead panel 204 of the moveable locking member 190 projects downwardly into the recess 180 adjacent the keeper post 182. The rear panel 208 of the moveable locking member 190 extends downwardly from a rear edge of the upper panel 206 substantially parallel to the rear panel 178 of the right mounting hook 172. FIG. 14 is a plan view of a sheet metal blank 210 used to form the moveable locking member 190 shown in FIGS. 10 through 12. Bend lines of the sheet metal blank are represented by the reference numeral 212. To form the moveable locking member 190 shown in FIGS. 10 through 12, the blank 210 is bent along bend lines 212 in the same direction to form a generally U-shaped channel. As shown in FIGS. 10 and 14, the rear panel 208 of the moveable locking member 190 includes a plurality of elongate slots 214, 216 and 218 adapted to receive mechanical fasteners, as hereinafter described.

Figure 15:
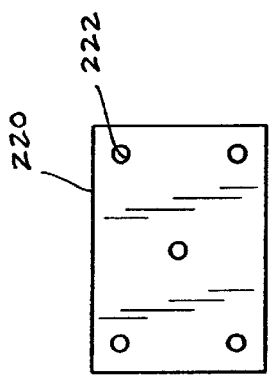
FIG. 15 is a top plan view of a spacer plate of the ladder mounting system of FIGS. 10 through 12.

As shown in FIGS. 11 and 12, the mounting mechanism 152 also includes a spacer plate 220 positioned between the rear panel 178 of the right mounting hook 172 and the rear panel 208 of the moveable locking member 190. FIG. 15 is a plan view of the spacer plate 220. As shown in FIG. 15, the spacer plate 220 includes a plurality of apertures 222 adapted to receive mechanical fasteners, as hereinafter described.

The moveable locking member 190 is adapted for lateral sliding movement along the right mounting hook 172 of the frame member 184 between a ladder-secured position (shown in FIGS. 10 and 11) wherein a latch portion 230 of the lead panel 204 of the moveable locking member 190 engages the keeper post 182 in a manner for securing the ladder 150 to the lower sill 158 of the trailer and a ladder-unsecured position (not shown) wherein the latch portion 230 is disengaged from the keeper post 182. As shown in FIGS. 10 and 14, the latch portion 230 of the lead panel 204 of the moveable locking member 190 has an inclined engagement surface 232 adapted for engagement with a lower portion of the keeper post 182 when the locking member 190 is in its ladder-secured position. The inclined surface 232 accommodates keeper posts of different depths below the surface of the sill of the trailer.

As shown in FIGS. 10 through 12, the mounting mechanism 152 includes two upper slide bolts 240 extending through the upper most slots 214 of the rear panel 208 of the moveable locking member 190 and a pair of lower slide bolts 242 extending through the lower most slots 216 of the rear panel 208 of the moveable locking member 190. As shown in FIG. 11, these slide bolts 240 and 242 extend completely through the rear panel 208 of the moveable locking member 190, through the upper and lower apertures 222 of the spacer panel 220, and finally terminate within the rear panel 178 of the right mounting hook 172 of the frame member 184. Preferably, the portions of the slide bolts 240 and 242 passing through the rear panel 208 of the moveable locking member 190 are not threaded, thus allowing the moveable locking member 190 to move relative to the frame member 184 with the slots 214 and 216 sliding smoothly along the slide bolts 240 and 242. Because the upper and lower slots 214 and 216 all extend in the same direction generally parallel to one another, the movement of the moveable locking member 190 is limited to sliding movement back and forth along the frame member 184.

As shown in FIG. 11, the mounting mechanism 152 also includes a central slide bolt 244, which extends completely through the central slot 218 in the rear panel 208 of the moveable locking member 190, through a central aperture 222 in the spacer panel 220, and finally terminates within the rear panel 178 of the right mounting hook 172 of the frame member 184. Preferably, the central slide bolt 244 includes a hand operable wing nut 246, which can be tightened against the rear panel 208 of the moveable locking member 190 to lock the position of moveable locking member 190 relative to the frame member 184.

Thus, to install the ladder 150 of this embodiment, the moveable locking member 190 is moved to its ladder-unsecured position (all the way to the right as viewed from FIG. 10) and the ladder 150 is positioned adjacent the rear sill 158 of the trailer. Then, the lead panels 174 of the mounting hooks 170 and 172 of frame member 184 and the lead panel 204 of the moveable locking member 190 are inserted into the recess 180 in the sill 158 until the upper panels 176 of the mounting hooks 170 and 172 of the frame member 184 rest on the upper surface of the sill 158, with the keeper post 182 being positioned in the space between the two mounting hooks 170 and 172. Finally, the moveable locking member 190 is moved to its ladder-secured position (all the way to the left as shown in FIG. 10) and the hand operable wing-nut 246 is tightened against the rear panel 208 of the moveable locking member 190 to lock the position of moveable locking member 190 relative to the frame member 184. In this position, the inclined engagement surface 232 of the latch portion 230 of the lead panel 204 engages against the lower portion of the keeper post 182 to prevent the ladder 150 from being lifted off of the sill 158.

Figure 16:
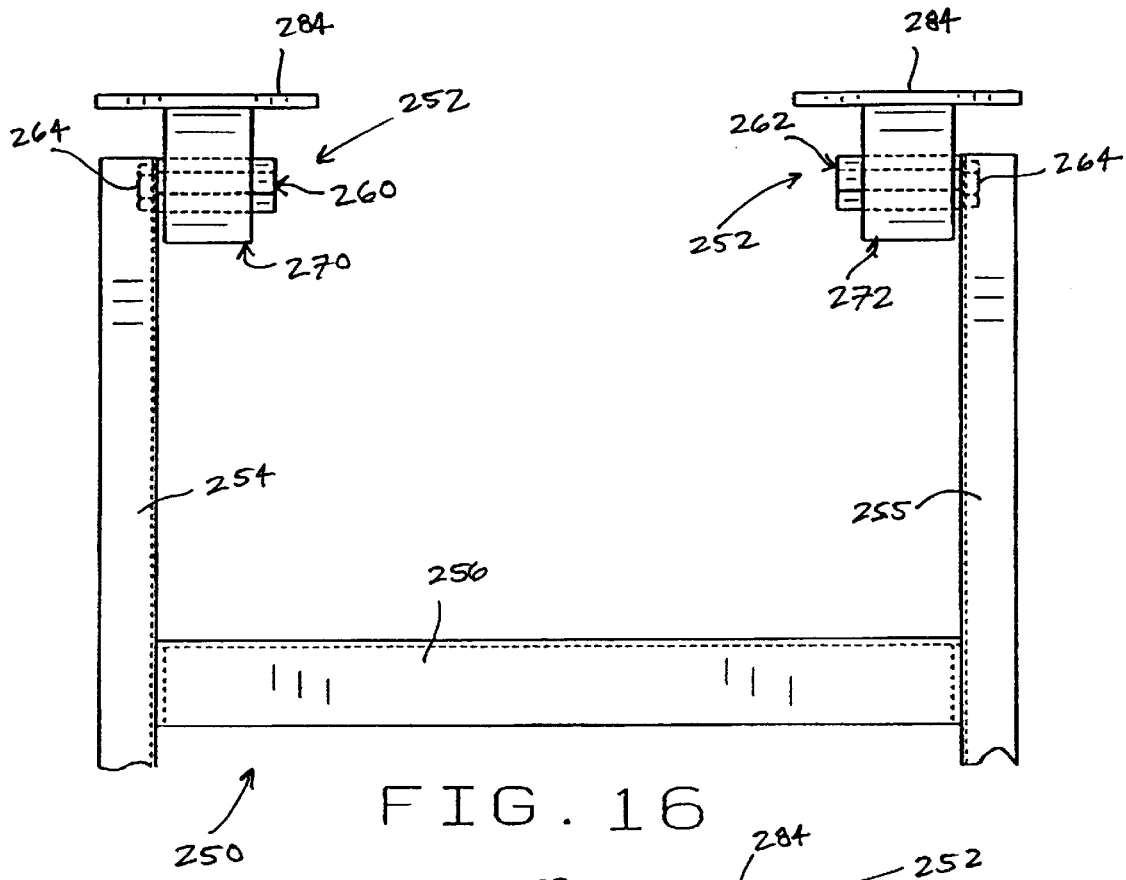
FIG. 16 is a fragmented front elevational view of a fourth embodiment of a ladder and ladder mounting system of the present invention.
Figure 17:
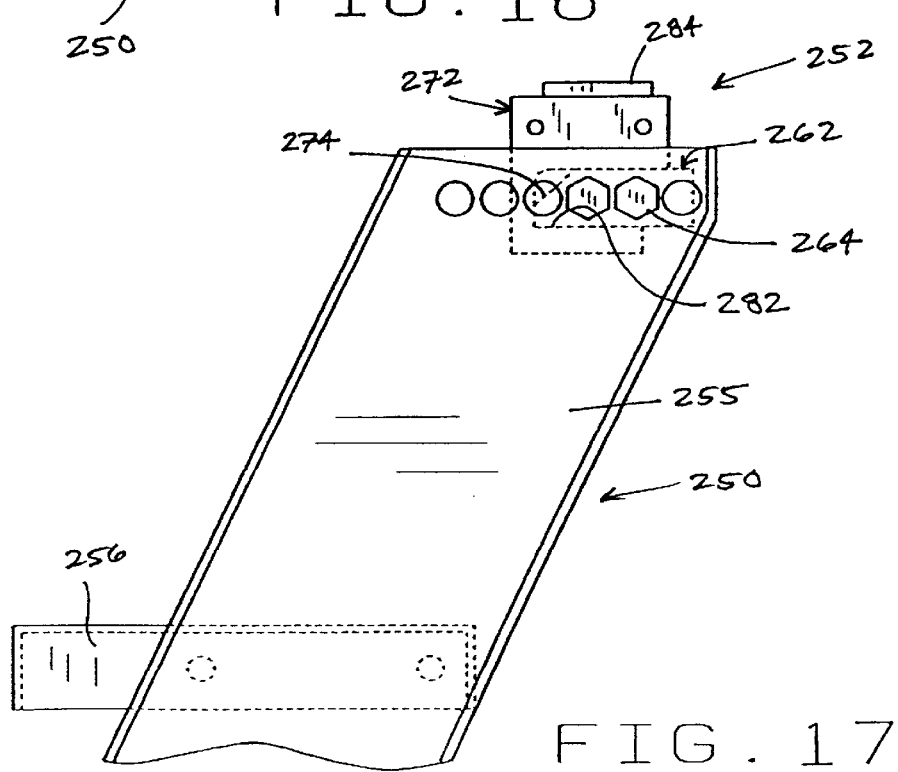
FIG. 17 is a fragmented right side elevational view of the ladder and ladder mounting system of FIG. 16.
Figure 18:
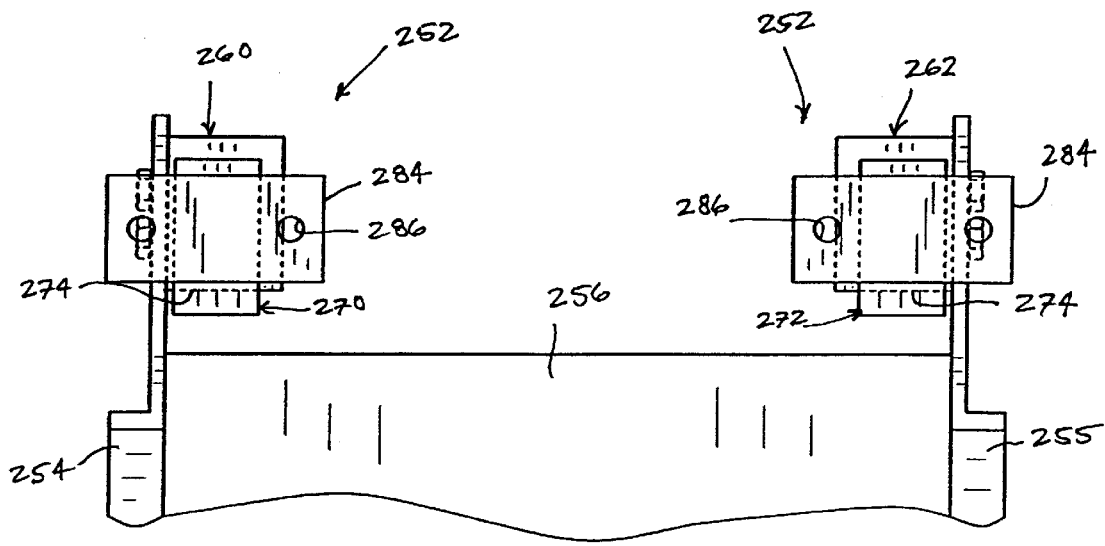
FIG. 18 is a top plan view of the ladder and ladder mounting system of FIG. 16.

A fourth embodiment of a ladder mounting mechanism of the present invention is shown in FIGS. 16 through 20, and is represented generally by the reference numeral 252. The mounting mechanism 252 is designed for mounting a ladder 250 to the rear bumper or lower sill of a truck trailer (not shown). The ladder 250 shown in FIGS. 16 through 18 is similar in all respects to the ladders 50 and 150 shown in FIGS. 2 through 5. The ladder 250 comprises a pair of elongate side rails 254 and 255 extending in parallel spaced relation to one another, and a plurality of transverse rungs 256 extending between and connecting the side rails 254 and 255 to one another.

The mounting mechanism 252 comprises first and second locking blocks 260 and 262. The first locking block 260 is connected to an upper portion of the left side rail 254 of the ladder 250 and the second locking block 262 is connected to the right side rail 255 of the ladder 250. Preferably, the first and second locking blocks 260 and 262 are connected to the side rails 254 and 255 with mechanical fasteners 264. As explained below, the first and second locking blocks 260 and 262 are adapted for engagement with first and second keeper members 270 and 272, which are adapted to be fixedly attached to the rear bumper or sill of the trailer (not shown) to which the ladder is to be mounted.

Figure 19:
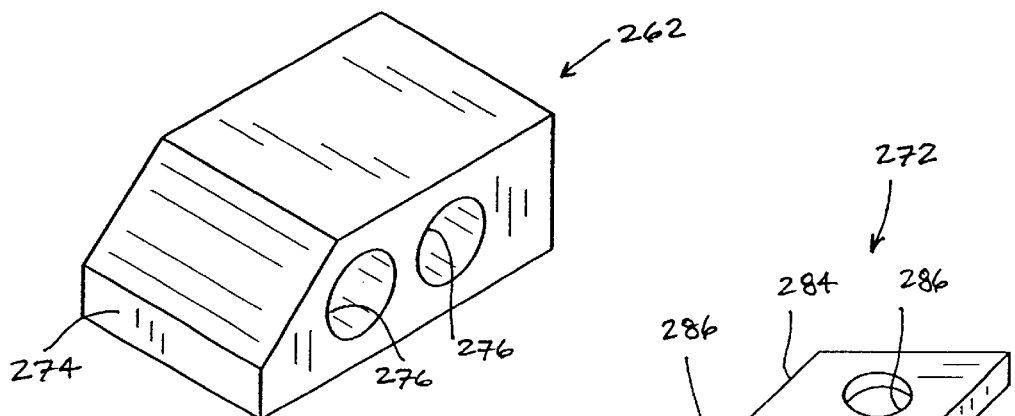
FIG. 19 is a perspective view of a locking block used in the ladder mounting system of FIG. 16.

FIG. 19 shows one of the first and second locking blocks 262, which are essentially identical to one another. As shown in FIG. 19, the locking blocks 260 and 262 each include a projecting front edge portion 274 and a pair of bores 276 adapted for receiving the mechanical fasteners 264.

Figure 20:
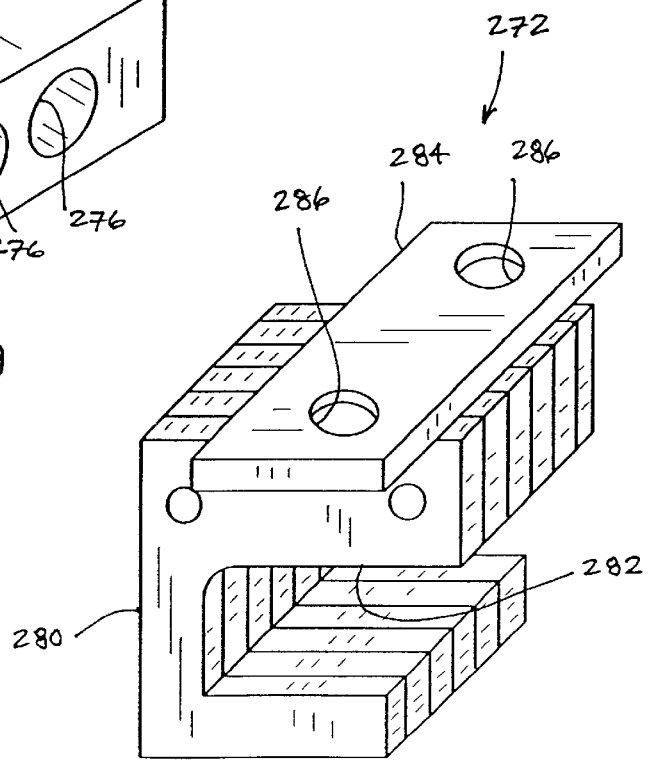
FIG. 20 is a perspective view of a keeper member used in the ladder mounting system of FIG. 16.

FIG. 20 shows one of the first and second keeper members 270 and 272, which are essentially identical to one another. As shown in FIG. 20, each keeper member has a main body portion 280 with a generally C-shaped cross sectional configuration defining a generally horizontally extending recess 282. The main body portion 280 shown in FIG. 20 is a lamination constructed from a plurality of stacked C-shaped plates. However, the main body portion could be constructed using different manufacturing methods, such as die casting, without departing from the scope of the present invention. Each keeper member also has a mounting bracket 284, attached to an upper surface of the main body portion 280, preferably by welds or mechanical fasteners. The mounting bracket 284 includes apertures 286 adapted to receive mechanical fasteners (not shown) for attaching the keeper member 272 to the rear bumper or sill of the trailer (not shown).

The recesses 282 of the keeper members 270 and 272 are adapted to receive the projecting front edge portions 274 of the first and second locking blocks 260 and 262, as best shown in FIG. 17. The weight of the ladder 250 rests on the lower portions of the keeper members 270 and 272. Preferably, at least the projecting front edge portions 274 of the first and second locking blocks 260 and 262 are dimensioned to fit closely within the recesses 282 of the first and second keeper members 270 and 272, respectively, in a manner so that the ladder 250 is supported by engagement of the first and second locking blocks 260 and 262 with the first and second keeper members 270 and 272.

Thus, to install the ladder 250 of this embodiment, the ladder is positioned adjacent the rear bumper or sill of the trailer with the first and second locking blocks 260 and 262 near the open ends of the recesses 282 in the main body portions 280 of the keeper members 270 and 272. Then, the ladder 250 is simply moved rearwardly of the trailer so that the projecting front edge portions 274 of the first and second locking blocks 260 and 262 are received within the recesses 282 of the first and second keeper members 270 and 272.

Figure 21:
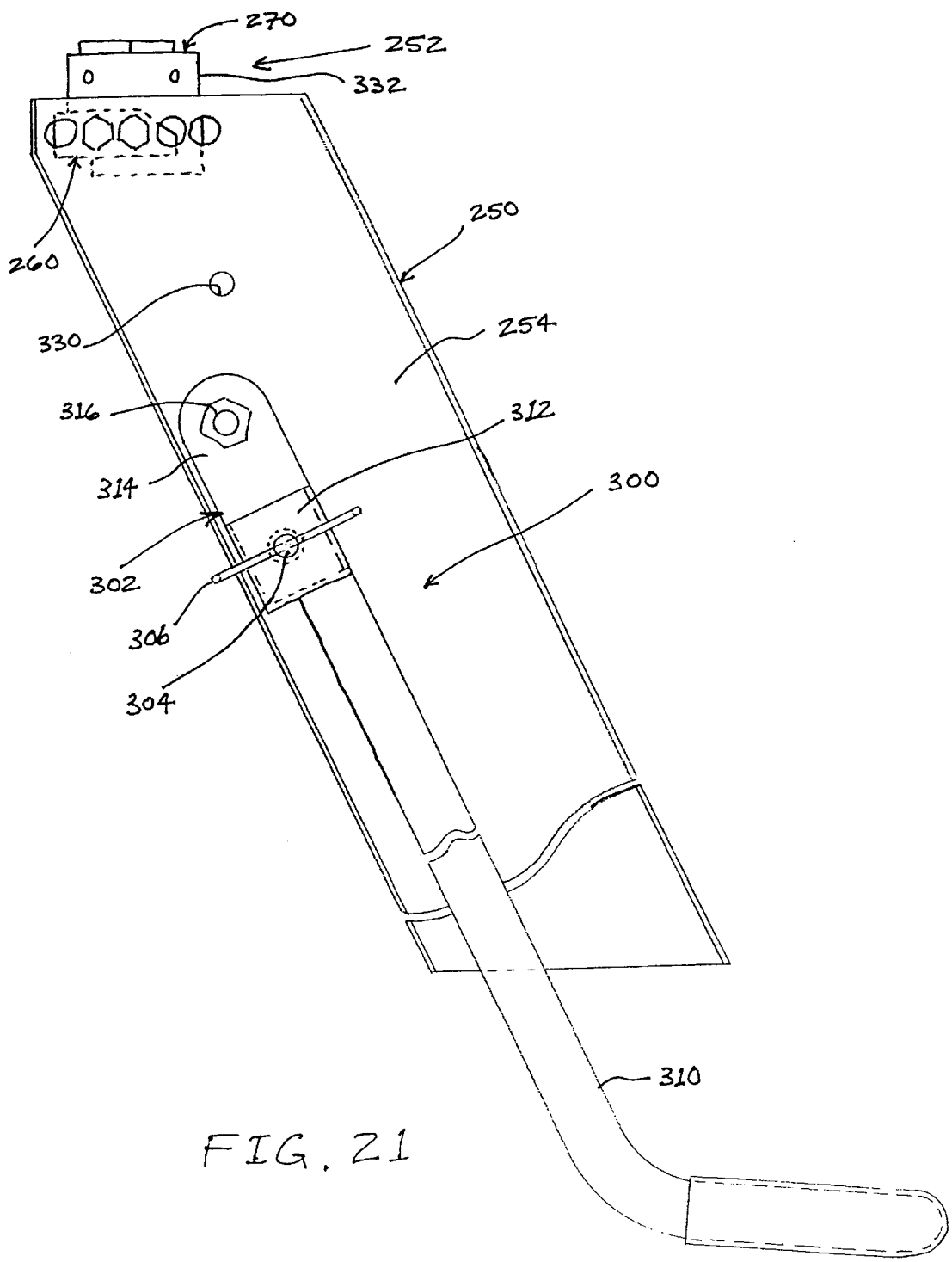
FIG. 21 is a fragmented left side elevational view of the ladder and ladder mounting system of FIG. 16 shown with a hand rail system of the invention in a down position.
Figure 22:
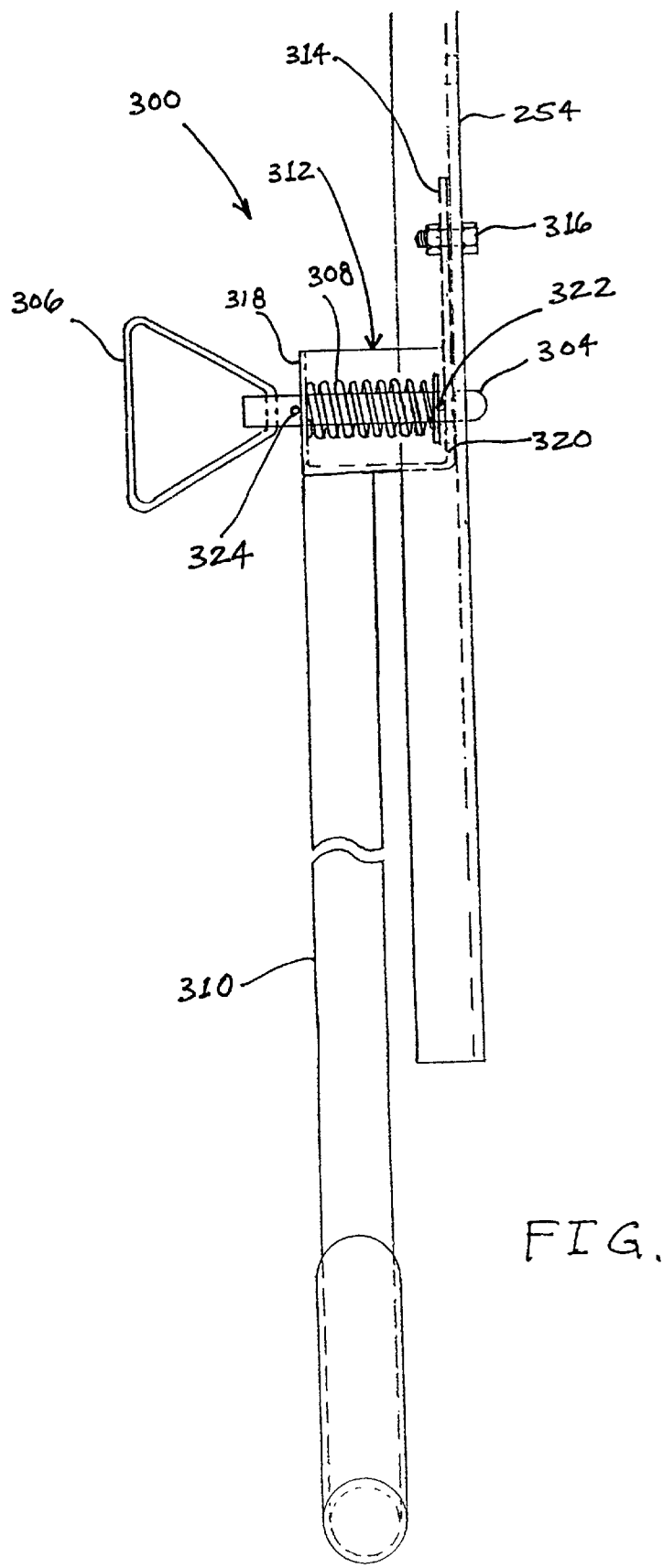
FIG. 22 is a fragmented front elevational view of the hand rail system shown in FIG. 21.
Figure 23:
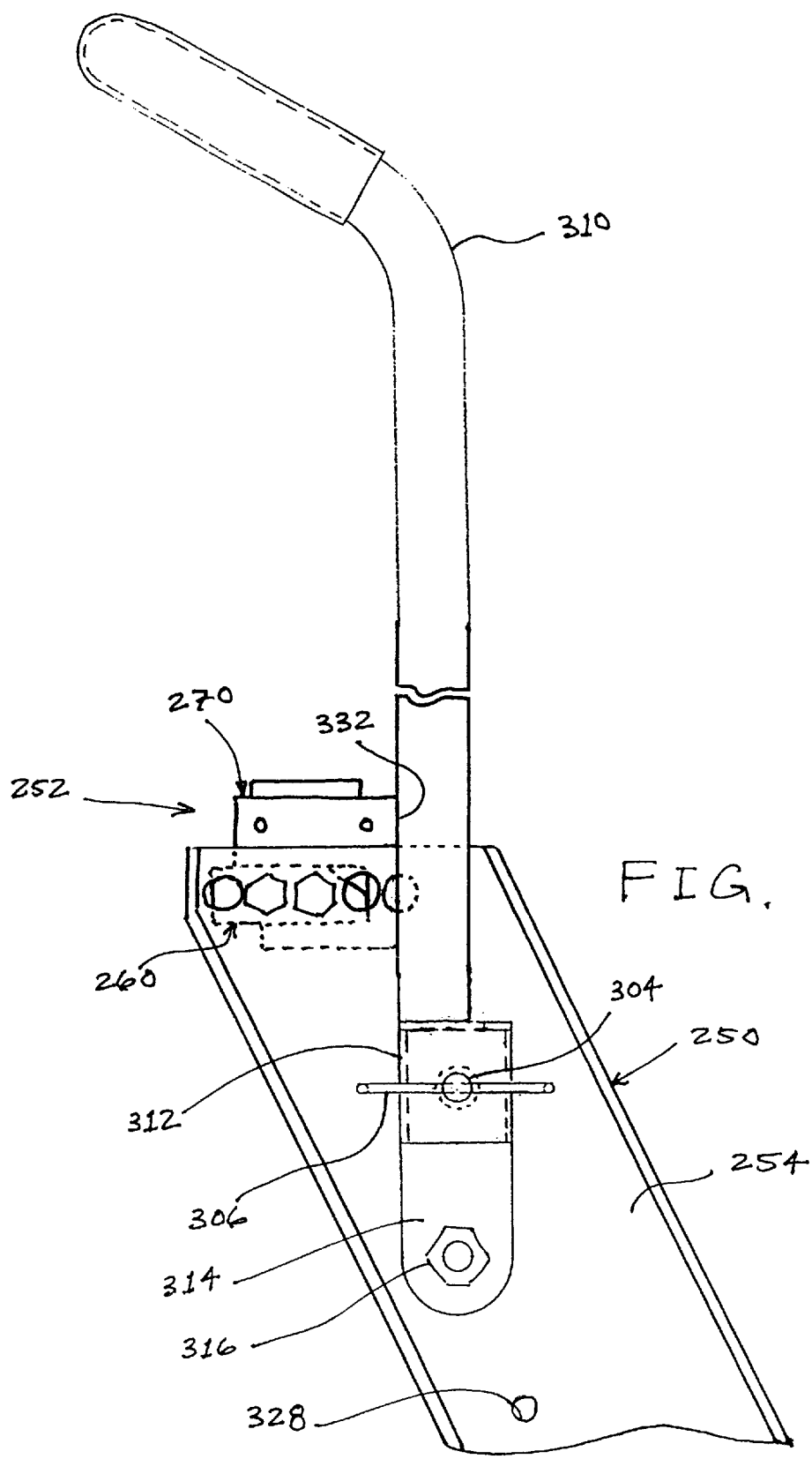
FIG. 23 is a fragmented left side elevational view of the ladder and ladder mounting system of FIG. 16 shown with the hand rail system of the invention in an up position.

FIGS. 21 through 23 show a handrail system, represented generally by the reference numeral 300, that is preferably used on connection with the ladder 250 and ladder mounting mechanism 252. In general, the handrail system 300 includes a pivotable mounting bracket 302, a lock rod 304, an actuator handle 306, a coil spring 308 and a cane 310.

The mounting bracket 302 has a locking portion 312 and a flange portion 314. The flange portion 312 is pivotally connected to the left side rail 254 of the ladder 250 by a pivot bolt 316 or other suitable pivot pin. The locking portion 312 of the mounting bracket 302 has left and right side walls 318 and 320. Each of the left and right side walls 318 and 320 of the locking portion 312 includes a hole through which the lock rod 304 extends (see FIG. 22). The actuator handle 306 is connected to an outer end of the lock rod 304, and is foldable relative to the rest of the handrail system 300 when it is not in use. The coil spring 308 surrounds a portion of the lock rod 304 between the left and right side walls 318 and 320. One end of the spring 308 engages the left side wall 318 and the other end engages a first cotter pin 322 on the distal end of the lock rod 304. The spring 308 biases the lock rod 304 toward a locked position as shown in FIG. 22. A second cotter pin 324 at the other end of the lock rod 304 engages against an outer surface of the left side wall 318 to prevent the lock rod 304 from moving any further into the locking portion 312 of the mounting bracket 302.

The handrail system is pivotable between an up position (shown in FIG. 23) and a down position (shown in FIGS. 21 and 22). As shown in FIG. 22, when the handrail system 300 is in its down position, the distal end of the lock rod 304 passes through a lower locking hole 328 in the left side rail 254 of the ladder 250. In this position, the handrail system 300 is fixed relative to the ladder 250 so that the entire apparatus can be easily stored or transported. To move the handrail system to its up position, the handle 306 is pulled outwardly (to the left as viewed in FIG. 22) against the spring bias until the distal end of the lock rod 304 is removed from the lower locking hole 328 in the left side rail 254 so that the mounting bracket 302, and indeed the entire handrail system 300, can be pivoted relative to the ladder 250 about the pivot bolt 316. The handrail system 300 is pivoted upwardly until the lock rod 304 is aligned with an upper locking hole 330 in the left side rail 254 of the ladder 250. Then, the handle 306 is released so that the spring 308 can bias the lock rod 304 back to its locked position with the lock rod 304 extending through the upper locking hole 330 in the left side rail 254 to lock the handrail system in place in its up position.

As best shown in FIG. 23, the handrail system 300 cooperates with the mounting mechanism 252 for securing the ladder 250 to the truck trailer. When the handrail system 300 is in its up position, a lower portion of the cane 310 engages against a vertical rear wall 332 of the first keeper member 270 so that the keeper member 270 is retained between the first locking block 260 and the cane 310.

Although the handrail system 300 has only been described as being mounted to the left side rail 254 of the ladder 250, it should be understood that, preferably, the ladder 250 includes a second handrail system (not shown) on its right side rail 256 essentially identical to the first handrail system 300 described above. When it is in an up position, the second handrail system engages against the second keeper member 272 so that the second keeper member 272 is retained between the second locking block 262 and the second handrail system.

Thus, to mount a ladder 250 incorporating the mounting mechanism 252 and handrail systems 300 of the present invention, the handrail systems are first moved to their down positions (as shown in FIGS. 21 and 22). Then, the ladder 250 is positioned adjacent the rear bumper or sill of the trailer with the first and second locking blocks 260 and 262 near the open ends of the recesses 282 in the main body portions 280 of the keeper members 270 and 272. Then, the ladder 250 is simply moved rearwardly of the trailer so that the projecting front edge portions 274 of the first and second locking blocks 260 and 262 are received within the recesses 282 of the first and second keeper members 270 and 272. Finally, the handrail systems 300 are moved upwardly to their up positions so that the keeper members 270 and 272 are retained between the locking blocks 260 and 262 and the handrail systems.

While the present invention has been described by reference to specific embodiments and particular uses, it should be understood that other configurations could be constructed, and different uses could be made, without departing from the scope of the invention as set forth in the following claims.

What is claimed is:

1. A ladder mounting mechanism for mounting a ladder to a truck trailer having at least one keeper member fixedly connected thereto, the ladder mounting mechanism comprising:

a frame adapted to be fixedly connected to the ladder, said frame including first and second elongate support members extending in parallel spaced relation to one another and at least one cross member extending transversely between the first and second support members, the cross member having a first end moveably connected to the first support member and a second end moveably connected to the second support member, the cross member being adapted for movement along the first and second support members; and at least one moveable locking member moveably connected to the frame and adapted for movement relative to the frame between a ladder-secured position wherein the locking member is adapted to engage the keeper member in a manner for securing the ladder to the truck trailer and a ladder-unsecured position wherein the locking member is adapted to disengage from the keeper member, wherein the moveable locking member is connected to the cross member in a manner to permit rotating movement of the moveable locking member relative to the frame.

2. The ladder mounting mechanism of claim 1 wherein the moveable locking member includes a latch portion and a hand-engaging portion, the latch portion being adapted for engagement with the keeper member in a manner to secure the ladder to the truck trailer when the locking member is in its ladder-secured position, the latch portion and the hand-engaging portion being operatively connected to one another so that movement of the hand-engaging portion causes movement of the latch portion between its ladder-secured position and its ladder-unsecured position.

3. The ladder mounting mechanism of claim 2 wherein the latch portion and the hand-engaging portion of the moveable locking member are of a unitary construction.

4. The ladder mounting mechanism of claim 2 wherein the latch portion of the moveable locking member includes a projection that is adapted to be received by a recess in the keeper member in a manner for securing the ladder to the truck trailer when the locking member is in its ladder-secured position.

5. The ladder mounting mechanism of claim 4 wherein the moveable locking member is mounted to the frame for rotating movement relative to the frame between its ladder-secured position and its ladder-unsecured position, and wherein the projection of the moveable locking member has a hook-shaped configuration adapted for engagement with a catch portion of the keeper member when the moveable locking member is rotated toward its ladder-secured position.

6. A ladder mounting mechanism for mounting a ladder to a truck trailer having at least one keeper member fixedly connected thereto, the ladder mounting mechanism comprising:

a frame adapted to be fixedly connected to the ladder; and at least one moveable locking member moveable connected to the frame and adapted for movement relative to the frame between a ladder-secured position wherein the locking member is adapted to engage the keeper member in a manner for securing the ladder to the truck trailer and a ladder-unsecured position wherein the locking member is adapted to disengage from the keeper member;

wherein said frame includes first and second elongate support members extending longitudinally in parallel spaced relation to one another and at least one cross member extending transversely between the first and second elongate support members, the cross member having a first end moveably connected to the first support member and a second end moveably connected to the second support member, the cross member being adapted for movement longitudinally along the first and second support members, the moveable locking member being connected to a portion of the cross member intermediate the first and second ends thereof.

7. The ladder mounting mechanism of claim 6 wherein the cross member includes a first sleeve member at its first end that at least partially surrounds a portion of the first support member and a second sleeve member at its second end that at least partially surrounds a portion of the second support member, the first and second sleeve members being slidable longitudinally along the first and second support members, respectively.

8. The ladder mounting mechanism of claim 7 wherein the moveable locking member includes a third sleeve member that at least partially surrounds a portion of the cross member intermediate the first and second ends thereof, the third sleeve member being slidable transversely along the cross member.

9. The ladder mounting mechanism of claim 8 wherein the third sleeve member and the portion of the cross member intermediate the first and second ends thereof have generally circular sectional configurations that permit the moveable locking member to rotate about the cross member.

10. The ladder mounting mechanism of claim 6 wherein said at least one moveable locking member constitutes a first moveable locking member and said at least one cross member constitutes a first cross member, the ladder mounting mechanism further comprising a second moveable locking member and a second cross member, the second moveable locking member being moveably connected to the frame and adapted for movement relative to the frame between a ladder-secured position wherein the second locking member is adapted to engage a second keeper member fixedly connected to the truck trailer in a manner for securing the ladder to the truck trailer and a ladder-unsecured position wherein the second locking member is adapted to disengage from the second keeper member, the second cross member extending transversely between the first and second elongate support members, the second cross member having a first end moveably connected to the first support member and a second end moveably connected to the second support member, the second cross member being adapted for movement longitudinally along the first and second support members, the second moveable locking member being connected to a portion of the second cross member intermediate the first and second ends thereof.

11. The ladder mounting mechanism of claim 10 wherein the first cross member is moveable along the first and second support members independently of the second cross member.

12. A ladder and mounting mechanism comprising:
at least one keeper member adapted to be fixedly connected to a truck trailer, the keeper member including a recessed keeper post adapted to be located within a recess in a floor of the truck trailer;
a ladder having a pair of elongate side rails extending in parallel spaced relation to one another, the side rails being connected to one another by a plurality of transverse rungs;
a frame adapted to be fixedly connected to the ladder, the frame including a generally horizontal cross member that extends between the elongate side rails; and
at least one moveable locking member moveably connected to the frame and adapted for movement relative to the frame between a ladder-secured position wherein the locking member is adapted to engage the keeper member in a manner for securing the ladder to the truck trailer and a ladder-unsecured position wherein the locking member is adapted to disengage from the keeper member, the moveable locking member having a latch portion and a hand-engaging portion, the latch portion comprising a plate with an engagement portion adapted for engagement with the keeper member in a manner to secure the ladder to the truck trailer when the locking member is in its ladder-secured position, the latch portion and the hand-engaging portion being operatively connected to one another so that movement of the hand-engaging portion causes movement of the latch portion between its ladder-secured position and its ladder-unsecured position, the moveable locking member being slidably connected to the frame for sliding movement relative to the frame between its ladder-secured position and its ladder-unsecured position, the latch portion of the locking member being adapted for engagement with the recessed keeper post in a manner to secure the ladder to the truck trailer when the locking member is in its ladder-secured position, the latch portion of the locking member being adapted to disengage from the keeper post when the locking member is in its ladder-unsecured position.

13. The ladder and mounting mechanism of claim, 12 wherein the frame includes at least one mounting member having a distal end adapted to project into the recess of the floor of the truck trailer, the moveable locking member having a generally inverted-U shaped cross-sectional configuration adapted to fit over a portion of the mounting member in manner to permit lateral sliding movement of the locking member relative to the frame.

14. The ladder and mounting mechanism of claim 13 wherein the moveable locking member includes at least one mechanical fastener adapted for engagement with the frame for locking the moveable locking member and the frame relative to one another.

15. The ladder and mounting mechanism of claim 12 wherein the latch portion of the locking member includes an inclined surface adapted for engagement with a lower portion of the keeper post when the locking member is in its ladder-secured position.

16. A ladder adapted to be mounted to a truck trailer having first and second keeper members fixedly connected thereto and spaced from one another, the ladder comprising:
a pair of elongate side rails extending in parallel spaced relation to one another, the side rails being connected to one another by a plurality of transverse rungs;
a frame fixedly connected to an upper portion of the ladder, said frame including first and second elongate support members extending in parallel spaced relation to one another, a first cross member extending transversely between the first and second support members, and a second cross member extending transversely between the first and second support members, each of the first and second cross members having a first end moveably connected to the first support member and a second end moveably connected to the second support member, the first and second cross members each being adapted for movement along the first and second support members;

a first moveable locking member moveably connected to the first cross member in a manner to permit rotating movement of the first moveable locking member relative to the frame between a ladder-secured position wherein the first locking member is adapted to engage the first keeper member in a manner for securing the ladder to the truck trailer and a ladder-unsecured position wherein the first locking member is adapted to disengage from the first keeper member; and a second moveable locking member moveably connected to the second cross member in a manner to permit rotating movement of the second moveable locking member relative to the frame between a ladder-secured position wherein the second locking member is adapted to engage the second keeper member in a manner for securing the ladder to the truck trailer and a ladder-unsecured position wherein the second locking member is adapted to disengage from the second keeper member.

17. The ladder of claim 16 wherein the first locking member includes a first latch portion and a first hand-engaging portion and the second locking member includes a second latch portion and a second hand-engaging portion;

the first latch portion being adapted for engagement with the first keeper member in a manner to secure the ladder to the truck trailer when the first locking member is in its ladder-secured position, the first latch portion and the first hand-engaging portion being operatively connected to one another so that movement of the first hand-engaging portion causes movement of the first latch portion between its ladder-secured position and its ladder-unsecured position;

the second latch portion being adapted for engagement with the second keeper member in a manner to secure the ladder to the truck trailer when the second locking member is in its ladder-secured position, the second latch portion and the second hand-engaging portion being operatively connected to one another so that movement of the second hand-engaging portion causes movement of the second latch portion between its ladder-secured position and its ladder-unsecured position.

18. The ladder of claim 17 wherein the first and second locking member are both mounted to the frame for rotating movement relative to the frame generally in the same plane.

19. The ladder of claim 18 further comprising a bracing member connected to one of the first and second hand engaging portions, the bracing member having a recess adapted to receive the first and second hand engaging portions in a manner to fix the relative positions of the first and second hand engaging portions when the first and second hand engaging portions are in their respective ladder-secured positions.

* * * * *